United States Patent
Izumihara

(10) Patent No.: US 10,234,166 B2
(45) Date of Patent: Mar. 19, 2019

(54) ENERGY SAVING DIAGNOSIS DEVICE, ENERGY SAVING DIAGNOSIS METHOD, AND PROGRAM

(71) Applicant: Mitsubishi Electric Corporation, Tokyo (JP)

(72) Inventor: Hiroko Izumihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 15/504,691

(22) PCT Filed: Oct. 10, 2014

(86) PCT No.: PCT/JP2014/077145
§ 371 (c)(1),
(2) Date: Feb. 17, 2017

(87) PCT Pub. No.: WO2016/056113
PCT Pub. Date: Apr. 14, 2016

(65) Prior Publication Data
US 2017/0277213 A1 Sep. 28, 2017

(51) Int. Cl.
*G05D 3/12* (2006.01)
*G05D 5/00* (2006.01)
(Continued)

(52) U.S. Cl.
CPC .............. *F24F 11/89* (2018.01); *F24F 11/30* (2018.01); *F24F 11/62* (2018.01); *G05B 15/02* (2013.01);
(Continued)

(58) Field of Classification Search
CPC .. F24F 11/89; F24F 11/62; F24F 11/64; F24F 11/46; F24F 11/30; F24F 2240/60;
(Continued)

(56) References Cited

U.S. PATENT DOCUMENTS

| 2006/0167591 A1 | 7/2006 | McNally | |
| 2013/0060390 A1* | 3/2013 | Sogo | G05B 15/02 700/286 |

(Continued)

FOREIGN PATENT DOCUMENTS

| JP | 2004-053103 A | 2/2004 |
| JP | 3783929 B2 | 3/2006 |

(Continued)

OTHER PUBLICATIONS

International Search Report of the International Searching Authority dated Jan. 6, 2015 for the corresponding international application No. PCT/JP2014/077145 (and English translation).

(Continued)

*Primary Examiner* — Mohammad Ali
*Assistant Examiner* — Md Azad
(74) *Attorney, Agent, or Firm* — Posz Law Group, PLC

(57) ABSTRACT

A first comparison-period specifier specifies a first to-be-compared period in a pre-implementation period before implementation of an energy saving control. A second comparison-period specifier specifies as a second to-be-compared period a to-be-compared candidate period having the highest similarity level between: parameters in a first parameter comparison period including a first comparison period and a first period immediately before or after the first comparison period, and parameters in a second parameter comparison period including a to-be-compared candidate period and a second period immediately before or after the to-be-compared candidate period. An energy saving diagnoser diagnoses the level of energy saving derived from the implementation of an energy saving control based on a power consumption amount in the first to-be-compared period and a power consumption amount in the second to-be-compared period.

3 Claims, 16 Drawing Sheets

(51) Int. Cl.
| | |
|---|---|
| *G05D 9/00* | (2006.01) |
| *G05D 11/00* | (2006.01) |
| *G05D 17/00* | (2006.01) |
| *F24F 11/89* | (2018.01) |
| *F24F 11/62* | (2018.01) |
| *F24F 11/30* | (2018.01) |
| *G05B 15/02* | (2006.01) |
| *G05F 1/66* | (2006.01) |
| *G06Q 50/06* | (2012.01) |
| *G06Q 10/06* | (2012.01) |
| *F24F 140/60* | (2018.01) |
| *F24F 140/50* | (2018.01) |
| *F24F 11/64* | (2018.01) |
| *F24F 130/00* | (2018.01) |
| *F24F 130/10* | (2018.01) |
| *F24F 11/46* | (2018.01) |

(52) U.S. Cl.
CPC ......... *G05F 1/66* (2013.01); *G06Q 10/06314* (2013.01); *G06Q 50/06* (2013.01); *F24F 11/46* (2018.01); *F24F 11/64* (2018.01); *F24F 2130/00* (2018.01); *F24F 2130/10* (2018.01); *F24F 2140/50* (2018.01); *F24F 2140/60* (2018.01)

(58) Field of Classification Search
CPC ............... F24F 2240/50; F24F 2130/00; F24F 2130/10; G05B 15/02; G05F 1/66; G06Q 50/06
USPC ........................................................ 700/291
See application file for complete search history.

(56) References Cited

U.S. PATENT DOCUMENTS

| | | | | |
|---|---|---|---|---|
| 2013/0289903 A1* | 10/2013 | Kazuno | .................. | G06Q 50/06 702/60 |
| 2014/0046496 A1* | 2/2014 | Mise | ..................... | G06Q 10/06 700/291 |

FOREIGN PATENT DOCUMENTS

| | | |
|---|---|---|
| JP | 2006-292282 A | 10/2006 |
| JP | 2012-194606 A | 10/2012 |
| JP | 2014-089766 A | 5/2014 |

OTHER PUBLICATIONS

Office Action dated Jan. 9, 2018 issued in corresponding JP patent application No. 2016-552777 (and partial English translation).

Extended European Search Report dated Jun. 19, 2018 issued in corresponding EP patent application No. 14903732.7.

Escriva-Escriva G et al., "Application of an energy management and control system to assess the potential of different control strategies in HVAC systems", Energy and Buildings, Nov. 1, 2010, pp. 2258-2267, vol. 42, No. 11.

* cited by examiner

FIG.5

| TIME | FIRST SYSTEM G1 | SECOND SYSTEM G2 | THIRD SYSTEM G3 |
|---|---|---|---|
| ⋮ | ⋮ | ⋮ | ⋮ |
| 2014/5/30 0:00 | 1.97 | 2.30 | 1.26 |
| ⋮ | ⋮ | ⋮ | ⋮ |
| 2014/6/24 10:00 | 1.90 | 2.36 | 1.27 |
| 2014/6/24 10:30 | 1.82 | 2.10 | 0.98 |
| 2014/6/24 11:00 | 2.10 | 2.46 | 1.15 |
| ⋮ | ⋮ | ⋮ | ⋮ |

FIG.6

| TIME | FIRST SYSTEM G1 | | | | |
|---|---|---|---|---|---|
| | INDOOR UNIT SUCTION TEMPERATURE[°C] | INDOOR UNIT ACTION | OUTDOOR TEMPERATURE [°C] | COMPRESSOR OPERATION FREQUENCY [Hz] | INDOOR TEMPERATURE [°C] |
| 2014/6/24 10:00 | 25.5 | 1(ON) | 29.8 | 50 | 24.2 |
| 2014/6/24 10:30 | 26.1 | 0(OFF) | 30.4 | 45 | 24.8 |
| 2014/6/24 11:00 | 24.9 | 1(ON) | 30.8 | 55 | 24.0 |
| ... | ... | ... | ... | ... | ... |

SECOND SYSTEM G2

THIRD SYSTEM G3

FIG.7

| THIRD SYSTEM G3 | |
|---|---|
| SECOND SYSTEM G2 | |
| FIRST SYSTEM G1 | |
| FIRST COMPARISON PERIOD | SECOND COMPARISON PERIOD |
| 2014/5/3 | 2014/6/12 |
| 2014/5/4 | 2014/6/6 |
| 2014/5/5 | 2014/6/15 |
| ⋮ | ⋮ |
| 2014/5/30 | 2014/6/3 |

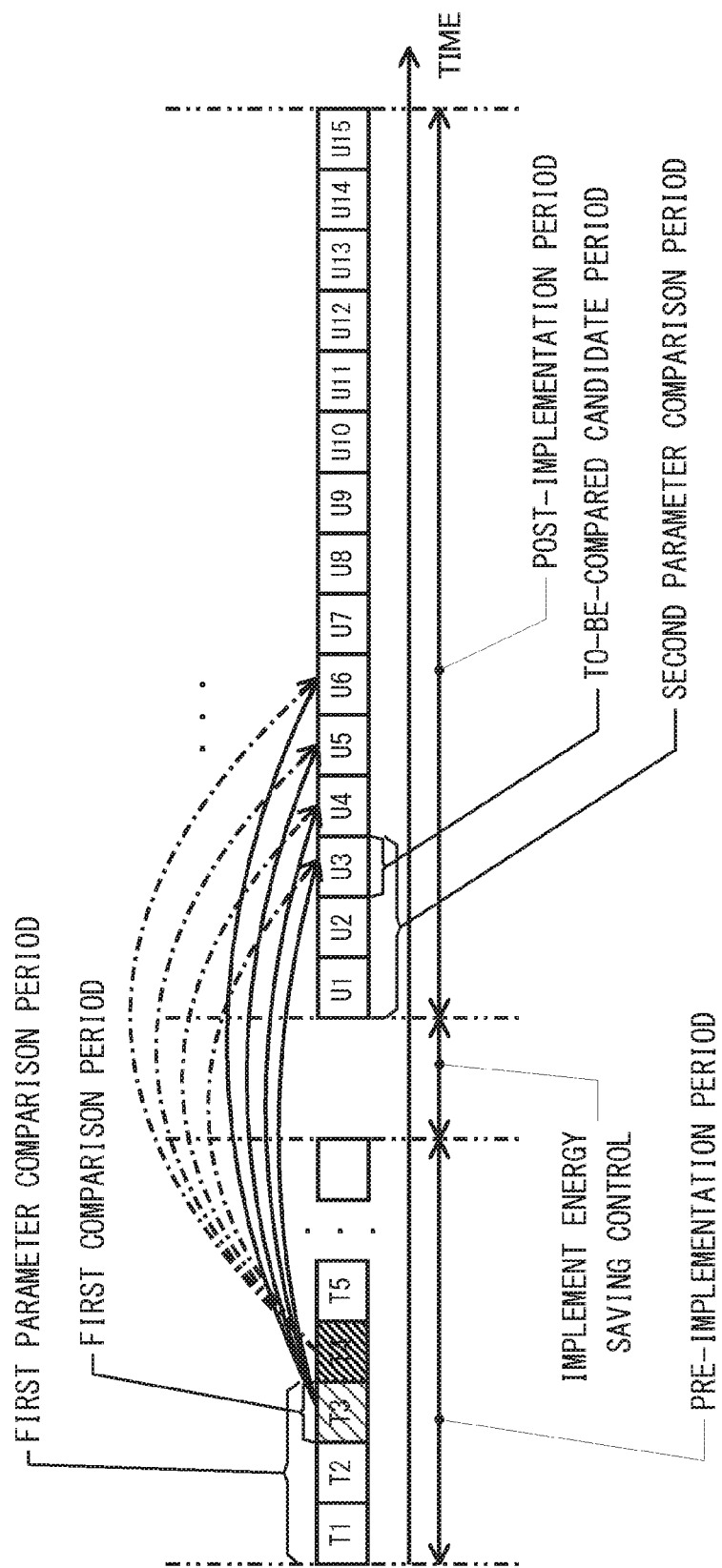

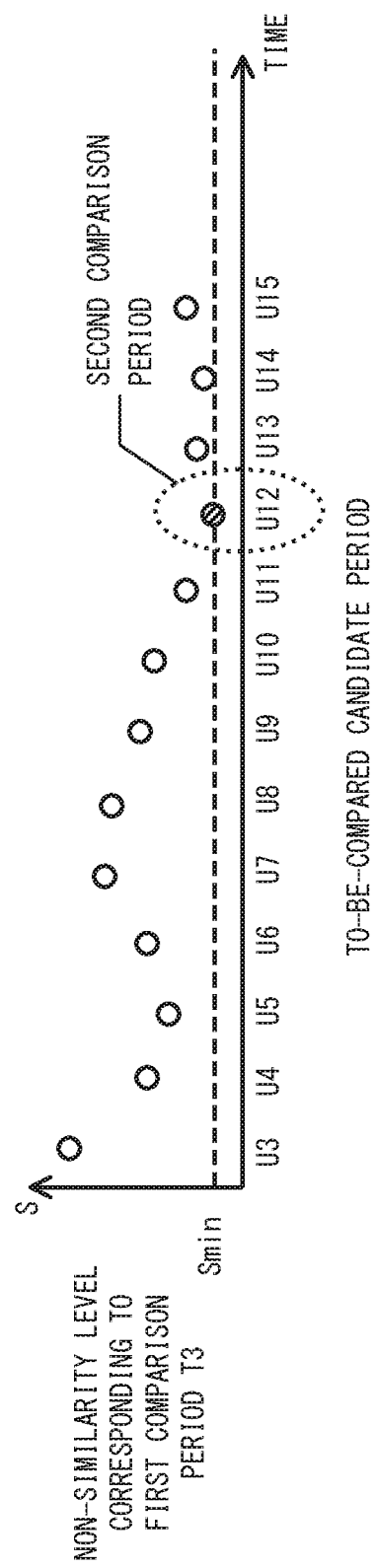

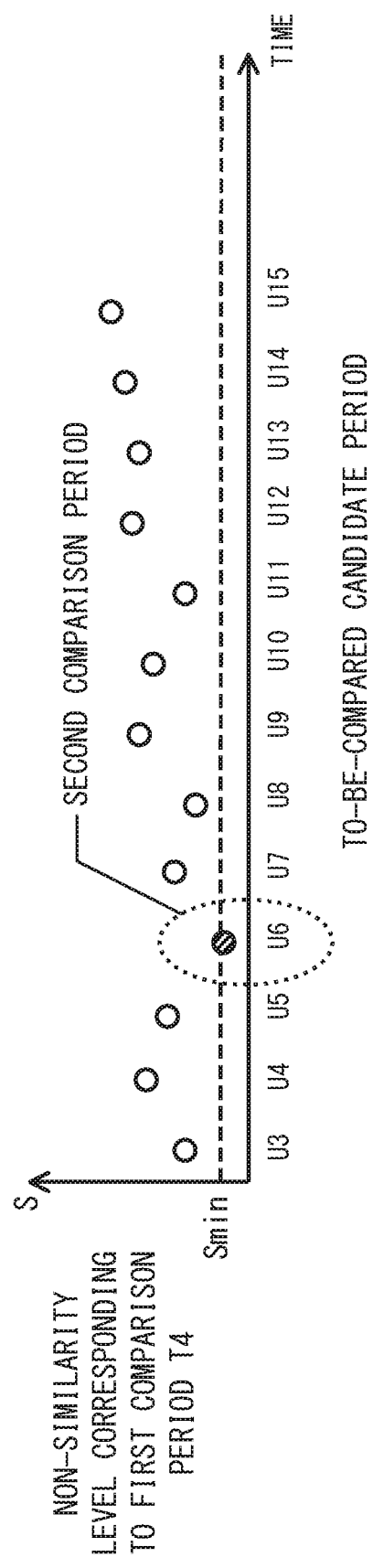

ENERGY SAVING DIAGNOSIS DEVICE, ENERGY SAVING DIAGNOSIS METHOD, AND PROGRAM

CROSS REFERENCE TO RELATED APPLICATION

This application is a U.S. national stage application of International Patent Application No. PCT/JP2014/077145 filed on Oct. 10, 2014, the disclosure of which is incorporated herein by reference.

TECHNICAL FIELD

The present disclosure relates to an energy saving diagnosis apparatus, an energy saving diagnosis method, and a program.

BACKGROUND ART

Conventionally, techniques of estimating an energy saving effect derived from an implementation of an energy saving control to facilities in view of environmental parameters such as a weather condition have been proposed. For example, Patent Literature 1 discloses a method of estimating an energy saving effect by evaluating a difference between an actual power consumption amount measured in facilities prior to the implementation of the energy saving control and a converted power consumption amount obtained by correcting the actual power consumption amount measured in facilities posterior to the implementation of the energy saving control in view of a weather condition.

CITATION LIST

Patent Literature

Patent Literature 1: Unexamined Japanese Patent Application Kokai Publication No. 2006-292282

SUMMARY OF INVENTION

Technical Problem

In practice, however, not only the environmental parameters on the day subjected to the evaluation but also the environmental parameters on the days before and after the subject day greatly affect the power consumption amount by an air conditioner. Hence, even if, simply, the environmental parameter on the day is similar, the conditions relating to the air conditioner are not always expected to be similar. Accordingly, the invention disclosed in Patent Literature 1 that takes the environmental parameter on the day only into consideration may be unable to estimate an accurate energy saving effect derived from the update on the facilities.

The present disclosure has been made in view of the foregoing circumstances, and an objective is to provide an energy saving diagnosis apparatus, an energy saving diagnosis method, and a program that are capable of improving the estimation accuracy on an energy saving effect.

Solution to Problem

In order to accomplish the above objective, an energy saving diagnosis apparatus according to the present disclosure includes:

a power-consumption-amount memory configured to store a power consumption amount consumed by an air conditioner in each of calculation periods, the power consumption amount being calculated in each calculation period;

a parameter memory configured to store parameters indicating an environment or an operation status of the air conditioner in each calculation period;

a first to-be-compared period specifier configured to specify a first to-be-compared period among first periods that include one period of a pre-implementation period and a post-implementation period, the pre-implementation period being before implementation of an energy saving control with the air conditioner, the post-implementation period being after the implementation of the energy saving control with the air conditioner;

a second to-be-compared period specifier configured to specify, when each of second periods that include another period of the pre-implementation period and the post-implementation period is a to-be-compared candidate period, as a second to-be-compared period, based on the parameters stored in the parameter memory, a to-be-compared candidate period having a highest similarity level between
1) parameters in a first parameter comparison period including the first to-be-compared period and a first period, among the first periods, immediately before or after the first to-be-compared period, and
2) parameters in a second parameter comparison period including the to-be-compared candidate period and a second period, among the second periods, immediately before or after the to-be-compared candidate period; and an energy saving diagnoser configured to obtain, based on the power consumption amount stored in the power-consumption-amount memory, a power consumption amount in the first to-be-compared period and a power consumption amount in the second to-be-compared period, and to diagnose, based on the power consumption amount in the first to-be-compared period and the power consumption amount in the second to-be-compared period, a level of energy saving derived from the implementation of the energy saving control.

Advantageous Effects of Invention

According to the present disclosure, a difference in parameters of each of the first to-be-compared period and of the period immediately before or after each to-be-compared candidate period is taken into consideration, and the second to-be-compared period that has a similar parameter to that of the first to-be-compared period is specified. Hence, a second to-be-compared period appropriate as a comparison object of the first to-be-compared period is specified, and thus the improvement of an estimation accuracy on an energy saving effect is accomplishable.

BRIEF DESCRIPTION OF DRAWINGS

FIG. 5 is a diagram illustrating power consumption amount data to be stored in a power-consumption-amount memory according to the embodiment;

FIG. 6 is a diagram illustrating parameters to be stored in a parameter memory according to the embodiment;

FIG. 7 is a diagram illustrating a specific period table according to the embodiment;

FIG. 11A is a diagram for explaining the comparison-period specifying process according to the embodiment;

FIG. 11B is a diagram for explaining the comparison-period specifying process according to the embodiment;

FIG. 11C is a diagram for explaining the comparison-period specifying process according to the embodiment;

DESCRIPTION OF EMBODIMENTS

Embodiments of the present disclosure will be explained below with reference to the accompanying figures.

Figure 1:
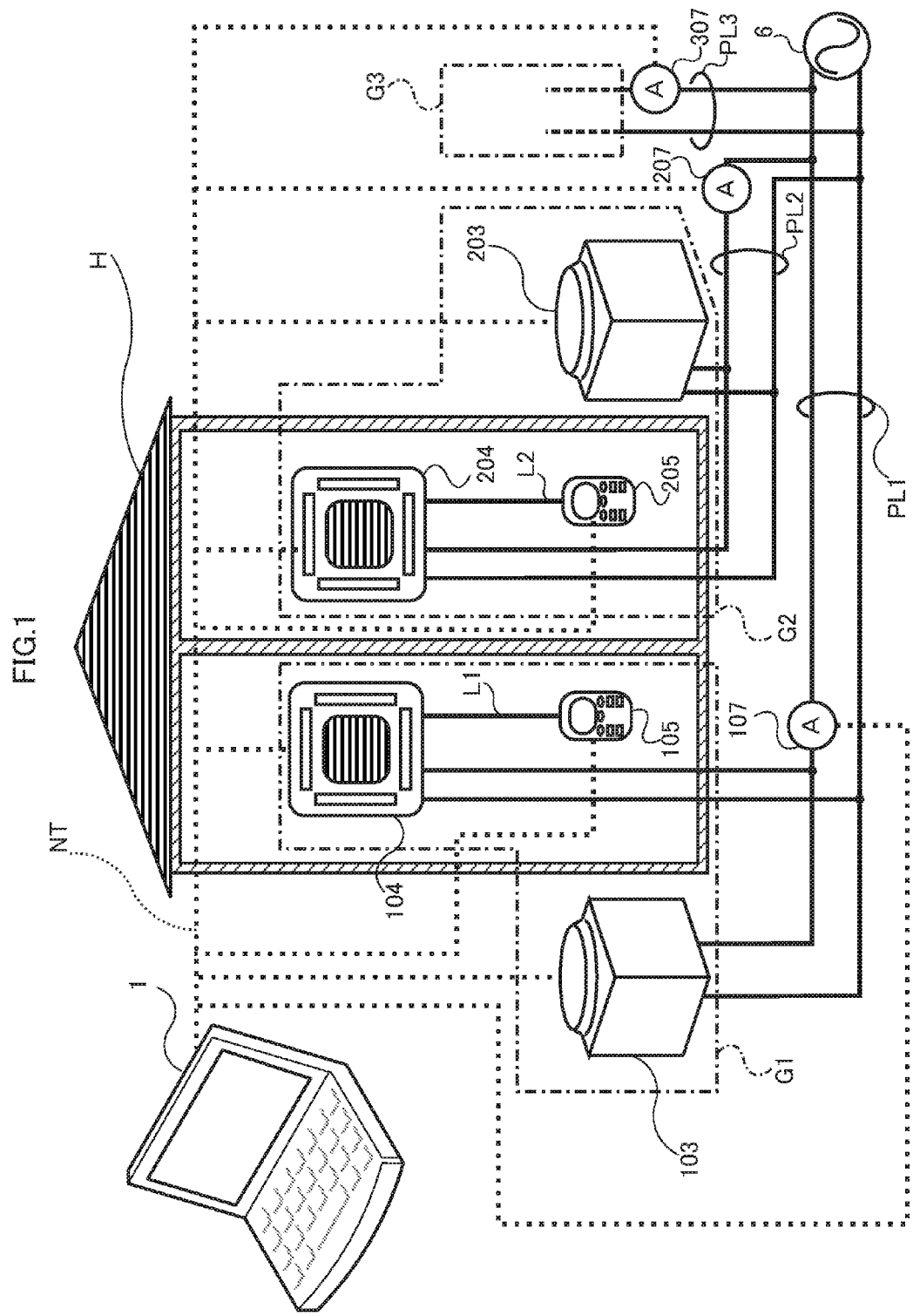
FIG. 1 is a schematic diagram illustrating an energy saving diagnosis apparatus and peripheral apparatuses thereof according to an embodiment.

As illustrated in FIG. 1, an energy saving diagnosis apparatus 1 is used together with air conditioners that include respective outdoor units 103 and 203 installed outside a building H, respective indoor units 104 and 204 installed inside the building H, and respective remote control terminals 105 and 205. The energy saving diagnosis apparatus 1 is connected to, via an air-conditioning communication network NT including such as a Local Area Network (LAN), the outdoor units 103 and 203, the indoor units 104 and 204, and the remote control terminals 105 and 205. The remote control terminals 105 and 205 are connected to the respective indoor units 104 and 204 via respective signal lines L1 and L2.

The outdoor unit 103, the indoor unit 104, and the remote control terminal 105 construct a first system G1, while the outdoor unit 203, the indoor unit 204, and the remote control terminal 205 construct a second system G2. An unillustrated third system G3 including an outdoor unit, an indoor unit, and a remote control terminal is further provided in the building H. The systems G1, G2, and G3 are connected to a power supply 6 via respective power supply lines PL1, PL2, and PL3. Ammeters 107, 207, and 307, are interposed in the respective power supply lines PL1, PL2, and PL3. The ammeters 107, 207, and 307 are also connected to the energy saving diagnosis apparatus 1 via the air-conditioning communication network NT.

Figure 2:
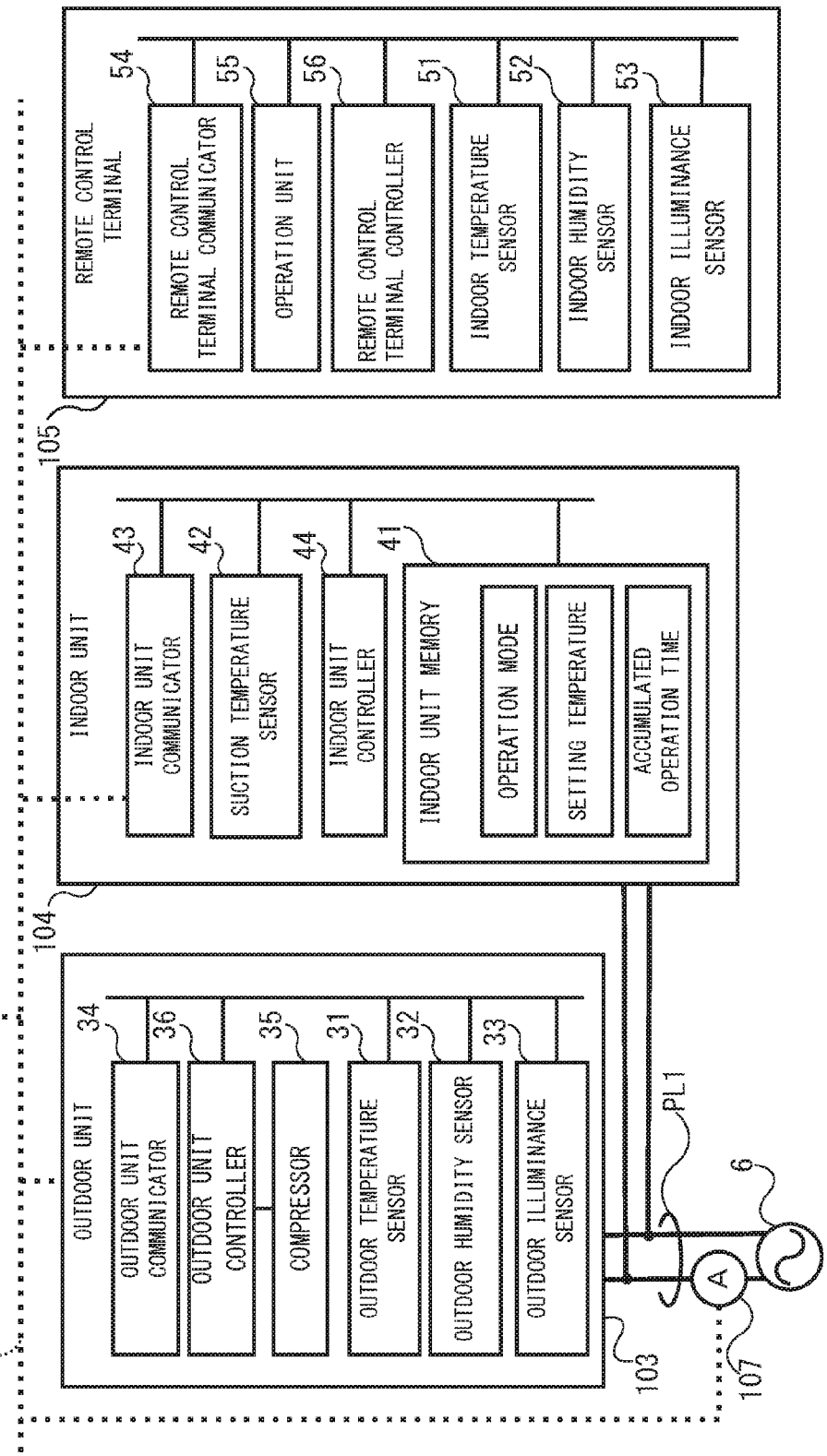
FIG. 2 is a block diagram illustrating respective hardware configurations of an outdoor unit, an indoor unit, and a remote control terminal according to the embodiment.

As illustrated in FIG. 2, the outdoor unit 103 includes an outdoor temperature sensor 31, an outdoor humidity sensor 32, and an outdoor illuminance sensor 33 that measure the outdoor temperature, humidity, and illuminance of the building H, respectively, an outdoor unit communicator 34 connected to the air-conditioning communication network NT, a compressor 35, and an outdoor unit controller 36. The compressor 35 is installed in a refrigerant piping (unillustrated) that connects an outdoor-unit-side heat exchanger (unillustrated) installed in the outdoor unit 103 with an indoor-unit-side heat exchanger (unillustrated) installed in the indoor unit 104, and circulates a refrigerant in the refrigerant piping. The outdoor unit 203 employs the same configuration.

The outdoor unit controller 36 includes, for example, a Central Processing Unit (CPU). The outdoor unit controller 36 generates outdoor temperature data, outdoor humidity data, and outdoor illuminance data based on the signals input from the outdoor temperature sensor 31, the outdoor humidity sensor 32, and the outdoor illuminance sensor 33, respectively, and sends the respective pieces of generated data to the air-conditioning communication network NT via the outdoor unit communicator 34. In addition, the outdoor unit controller 36 controls the action of the compressor 35, and sends data indicating the revolution frequency of the compressor 35 to the air-conditioning communication network NT via the outdoor unit communicator 34.

As illustrated in FIG. 2, the indoor unit 104 includes an indoor unit memory 41, a suction temperature sensor 42 that measures a suction temperature of the indoor unit 104, an indoor unit communicator 43 connected to the air-conditioning communication network NT, and an indoor unit controller 44. The indoor unit 204 employs the same configuration.

The indoor unit memory 41 includes, for example, a memory and the like, and stores information indicating the operation mode of the air conditioner including the outdoor unit 103 and the indoor unit 104, a setting temperature, and an accumulated operation time. The operation mode includes, for example, a cooling operation mode and a heating operation mode. The setting temperature is, for example, a setting temperature for the suction temperature by the air conditioner. The accumulated operation time is a time obtained by accumulating operation times of the air conditioner.

The indoor unit controller 44 includes, for example, a CPU. The indoor unit controller 44 generates suction temperature data using the suction temperature sensor 42, and sends the generated suction temperature data to the air-conditioning communication network NT via the indoor unit communicator 43. In addition, the indoor unit controller 44 obtains information indicating the operation mode, the setting temperature, and the accumulated operation time from the indoor unit memory 41, and sends the respective pieces of obtained information to the air-conditioning communication network NT. Still further, the indoor unit controller 44 updates the accumulated operation time stored in the indoor unit memory 41 every time the air conditioner is stopped. More specifically, the indoor unit controller 44 updates the accumulated operation time by adding the time, from the latest operation start time until the stopped time of the air conditioner, to the accumulated operation time stored in the indoor unit memory 41.

The remote control terminal 105 includes an indoor temperature sensor 51, an indoor humidity sensor 52, and an indoor illuminance sensor 53 that measure the temperature, the humidity, and the illuminance inside the building H, respectively, a remote control terminal communicator 54 connected to the air-conditioning communication network NT, an operation part 55, and a remote control terminal controller 56. The remote control terminal 205 employs the same configuration.

The operation part 55 includes multiple types of push buttons. A resident of the building H is capable of controlling the action of the outdoor unit 103 and that of the indoor unit 104 by appropriately operating the operation part 55.

The remote control terminal controller 56 includes, for example, a CPU. The remote control terminal controller 56 generates indoor temperature data, indoor humidity data, and indoor illuminance data using the indoor temperature sensor 51, the indoor humidity sensor 52, and the indoor illuminance sensor 53, and sends the respective pieces of generated data to the air-conditioning communication network NT via the outdoor unit communicator 34. In addition, the outdoor unit controller 36 sends, upon receiving a control instruction given by the operation part 55 by the resident of the building H, a control signal in accordance with the details of the given control instruction to the air-conditioning communication network NT via the remote control terminal communicator 54.

The power supply 6 outputs, for example, AC voltage of 200 V.

The ammeter 107 performs sampling on the current value of an AC current flowing through the power supply line PL1 at a constant time interval, and sends current value data indicating the sampled current value to the air-conditioning communication network NT. An example time interval of the sampling by the ammeter 107 is set to be for example 2 through 5 msec. The ammeters 207 and 307 employ the same configuration.

Figure 3:
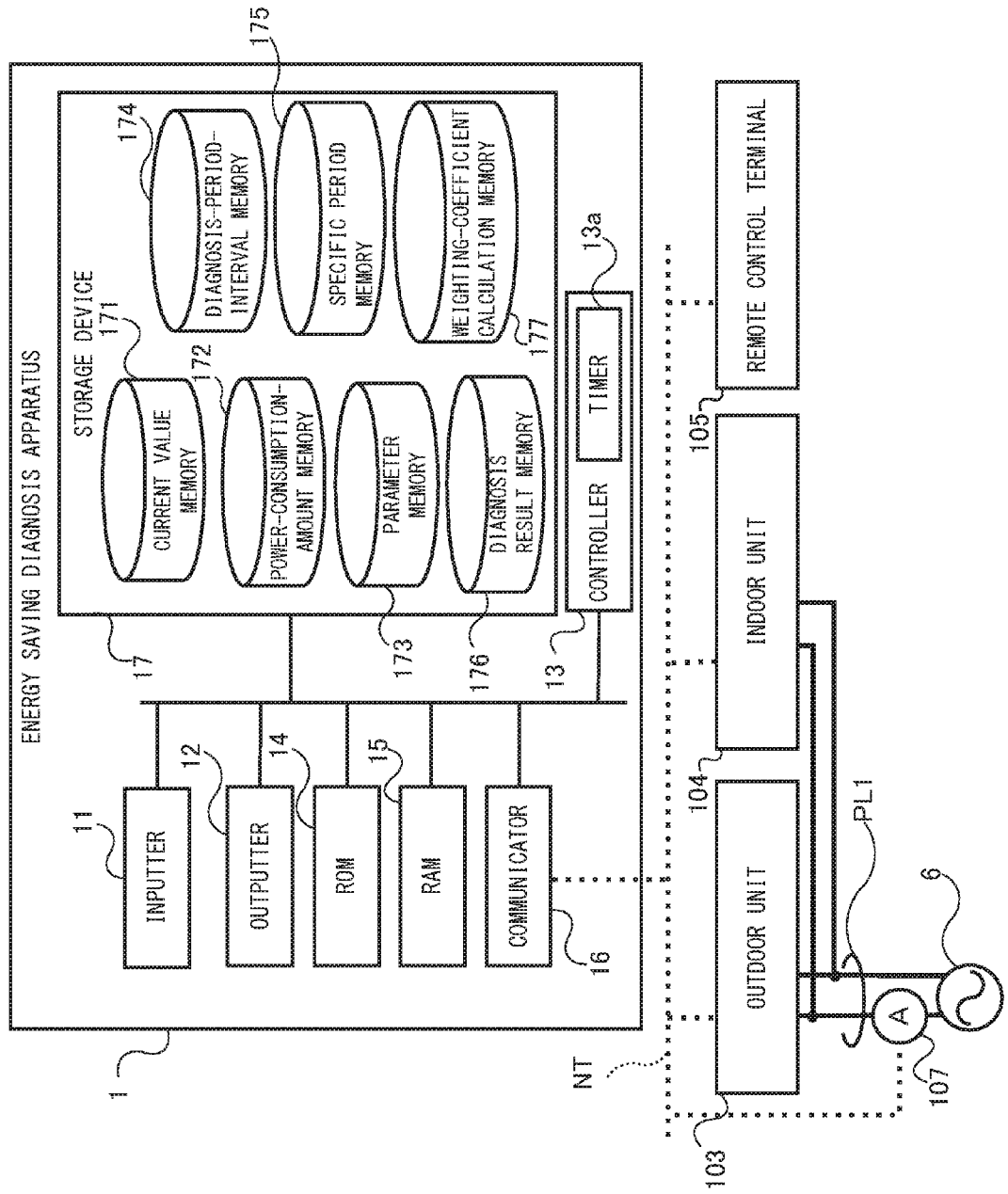
FIG. 3 is a block diagram illustrating a hardware configuration of the energy saving diagnosis apparatus according to the embodiment.

The energy saving diagnosis apparatus 1 collects various parameters from the air conditioner, and calculates an estimated value of the power consumption amount from which environmental effects are eliminated based on the actual measured value of the power consumption amount by the air conditioner and the collected various parameters. The energy saving diagnosis apparatus 1 includes, for example, a general-purpose personal computer. As illustrated in FIG. 3, the energy saving diagnosis apparatus 1 includes an inputter 11 that allows a user to input various information, an outputter 12 that outputs the various information, a controller 13, a Read Only Memory (ROM) 14, a Random Access Memory (RAM) 15, a communicator 16 connected to the air-conditioning communication network NT, and a storage device 17.

The inputter 11 includes, for example, a keyboard or the like. The inputter 11 accepts various information input by the user.

The outputter 12 includes, for example, a liquid crystal display or the like. The outputter 12 outputs various information input from the controller 13.

The controller 13 includes, for example, a CPU, and controls the overall energy saving diagnosis apparatus 1. For example, the controller 13 executes an energy saving diagnosis process. The energy saving diagnosis process will be explained later in detail. In addition, a timer 13*a* that counts a time is built into the controller 13.

The ROM 14 includes a non-volatile memory, and stores, for example, a program for the controller 13 to control the overall energy saving diagnosis apparatus 1. The ROM 14 stores, for example, a program to execute the energy saving diagnosis process.

The RAM 15 includes a volatile memory. A work area that temporarily stores necessary data and the like for the controller 13 to execute a process is provided in a part of the RAM 15.

The communicator 16 includes, for example, an interface device to establish a connection with the air-conditioning communication network NT.

The storage device 17 includes a hard disk drive or the like. The storage device 17 includes a current value memory 171 that stores the current value, a power-consumption-amount memory 172 that stores the power consumption amount, and a parameter memory 173 that stores the various parameters.

The current value memory 171 stores the obtained current value from the ammeter 107 via the air-conditioning communication network NT.

The power-consumption-amount memory 172 stores the power consumption amount by the air conditioner. The power-consumption-amount memory 172 stores the power consumption amount prior to an implementation of the energy saving control to the air conditioner, and the power consumption amount after the implementation of the energy saving control. As illustrated in FIG. 5, for example, the power-consumption-amount memory 172 stores the respective power consumption amounts by the multiple air-conditioner systems in a system-by-system manner and in association with time information. In this case, the time information is equivalent to, for example, an end time for the period at which the corresponding power consumption amount is calculated.

The parameter memory 173 stores the various parameters obtained at the outdoor unit 103, the indoor unit 104, and the remote control terminal 105, respectively. The parameter memory 173 stores various parameters prior to the implementation of the energy saving control to the air conditioner, and various parameters after the implementation of the energy saving control. The parameters include environmental parameters and operation parameters. The environmental parameters are parameters that indicate an environment where the air conditioner (the outdoor unit 103 and the indoor unit 104) is installed, such as the outdoor temperature, the weather, and the sunshine hours. The operation parameters are parameters indicating the operation status of the air conditioner, such as the operation mode, the setting temperature, and the accumulated operation time of the air conditioner. As illustrated in FIG. 6, for example, for the multiple air-conditioner systems in a system-by-system manner, the parameter memory 173 stores a set of parameter information indicating the parameters, such as the indoor unit suction temperature, the indoor unit action, the outdoor temperature, the compressor operation frequency, and the indoor temperature, at a given time, and stores multiple sets of those parameters in association with the respective pieces of time information. In this case, the "indoor unit suction temperature", the "outdoor temperature", and the "indoor temperature" correspond to the environmental parameters, while the "indoor unit action" and the "compressor operation frequency" correspond to the operation parameters.

A diagnosis-period-time-interval memory 174 stores information indicating a pre-implementation period prior to when the energy saving control is implemented with the air conditioner, information indicating a post-implementation period after the energy saving control is implemented, and time interval information indicating the time interval to calculate the power consumption amount. The information indicating the pre-implementation period and the information indicating the post-implementation period each contains period start time information indicating the start time of the period, and period end time information indicating the end time of the period. The pre-implementation period and the post-implementation period are set to be, for example, one month. The time interval information contains information indicating the time interval to calculate the power consumption amount and to obtain the parameters. This time interval is set to be, for example, 30 minutes.

A specific period memory 175 stores, for each system G1, G2, and G3, a specific period table that associates a first comparison period (first to-be-compared period) contained in the pre-implementation period with a second comparison period (second to-be-compared period) that has the most similar parameter to that of the first comparison period within the post-implementation period. In this case, the time length of the first comparison period (also the second comparison period) is set to be the same time length to a first period (second period) that is a unit of period to search the period having the similar parameter to the pre-implementation period within the post-implementation period. In addition, the first period and the second period have the same time length.

An explanation will be given of an example case in which it is assumed that the pre-implementation period is the month of May 2014, the post-implementation period is the month of June 2014, and the first comparison period and the second comparison period both have the time length that is set to be one day. In this case, as illustrated in FIG. 7, for example, the specific period table for the first system G1 associates each first comparison period "5/3", "5/4", "5/5", . . . , and "5/30" with each second comparison period "6/12", "6/6", "6/15", . . . , and "6/3". In this case, the second comparison periods that have the similar parameters to the respective first comparison periods "5/3", "5/4", "5/5", . . . , and "5/30" are "6/12", "6/6", "6/15", . . . , and "6/3".

A diagnosis result memory 176 stores, for each system G1, G2, and G3, the diagnosis result that is an effect value indicating the energy saving effect calculated by an energy saving diagnoser 135 and to be derived from the implementation of the energy saving control.

A weighting-coefficient calculation memory 177 stores a weighting coefficient utilized by a coefficient setter 137, a non-similarity level S utilized to calculate the weighting coefficient, and a difference in power consumption amount.

Figure 4:
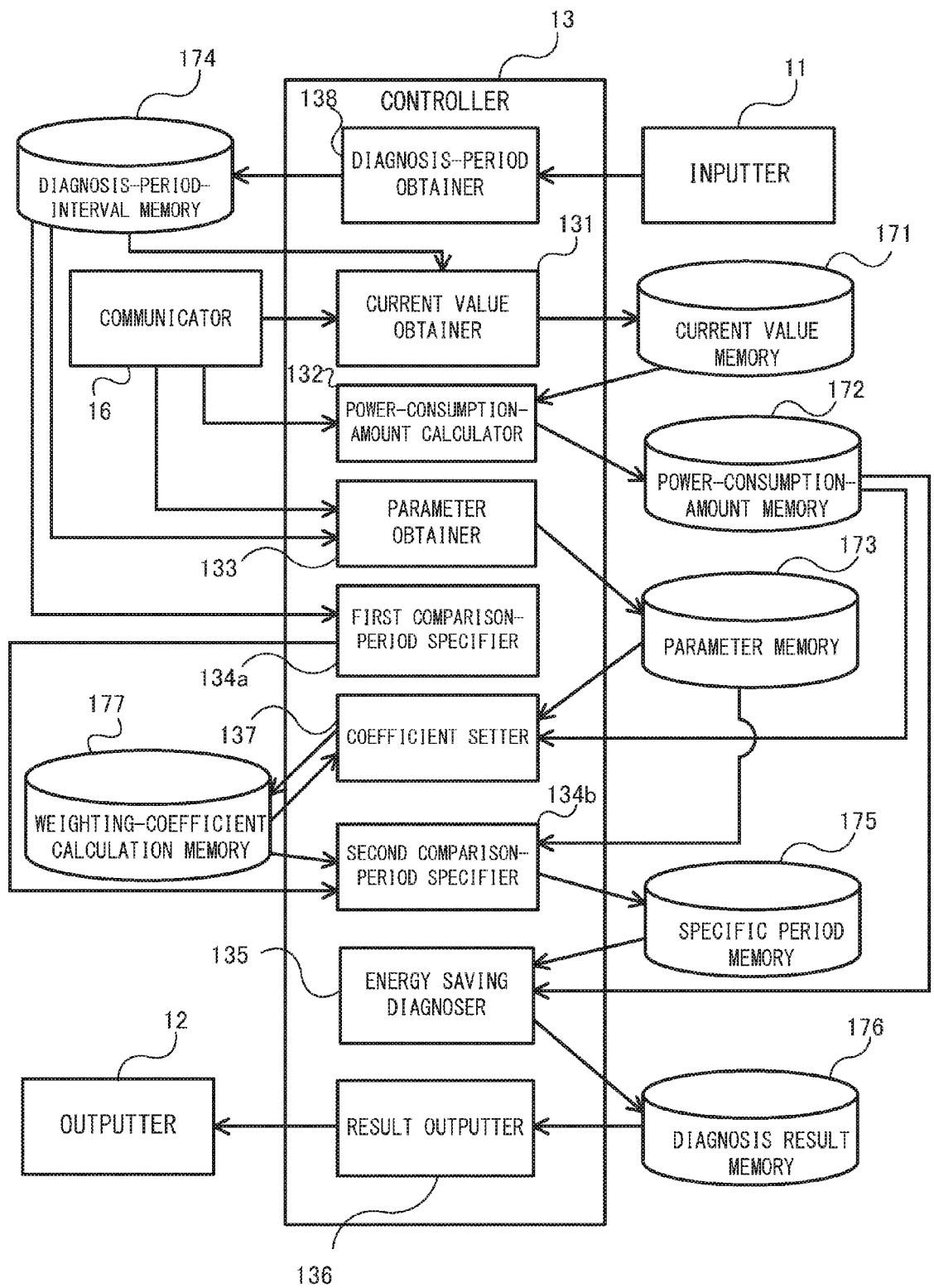
FIG. 4 is a block diagram illustrating a functional configuration of the energy saving diagnosis apparatus according to the embodiment.

Next, a functional configuration of the controller 13 of the energy saving diagnosis apparatus 1 according to this embodiment will be explained. As illustrated in FIG. 4, the controller 13 functions as a current value obtainer 131, a power-consumption-amount calculator 132, a parameter obtainer 133, a first comparison-period specifier 134a, a second comparison-period specifier 134b, the energy saving diagnoser 135, a result outputter 136, and the coefficient setter 137.

The current value obtainer 131 obtains current value data sent from the respective ammeters 107, 207, and 307 to the air-conditioning communication network NT, and stores the obtained current value data in the current value memory 171. The current value obtainer 131 stores, in the current value memory 171 for each system, the current value data in association with measurement time information indicating the measurement time of the current value.

The power-consumption-amount calculator 132 calculates the power consumption amount by the air conditioner. More specifically, the power-consumption-amount calculator 132 calculates the power consumption amount per a constant time interval based on the current value data stored in the current value memory 171, and stores the calculated power consumption amount in the power-consumption-amount memory 172 together with the time information. In the example case illustrated in FIG. 5, the power-consumption-amount calculator 132 has the time interval set to be 30 minutes, and calculates the power consumption amount for each 30 minutes. More specifically, the power-consumption-amount calculator 132 calculates the power consumption amount at the time "2014/6/24 10:00" based on the pieces of current value data from "2014/6/24 9:30" to "2014/6/24 10:00". The action of the power-consumption-amount calculator 132 will be explained later in detail.

The parameter obtainer 133 obtains the various parameters per a constant time interval from the air conditioner via the air-conditioning communication network NT. The parameter obtainer 133 obtains, for example, the parameters obtained at the outdoor unit 103, the indoor unit 104, and the remote control terminal 105 via the air-conditioning communication network NT, and stores the obtained parameters in the parameter memory 173. In the example case illustrated in FIG. 6, the parameter obtainer 133 obtains the parameters that are the suction temperature of the indoor unit 104, the action status of the indoor unit 104, the outdoor temperature, the compressor operation frequency, and the indoor temperature. In addition, FIG. 6 illustrates an example case in which the parameter obtainer 133 has the time interval set to be 30 minutes. Still further, the time information associated with the various parameters is set so as to be consistent with the time information associated with the power consumption amount.

The first comparison-period specifier (first to-be-compared period specifier) 134a specifies the first comparison period among the multiple first periods included the pre-implementation period.

The second comparison-period specifier (second to-be-compared period specifier) 134b specifies, as the second comparison period, a to-be-compared candidate period that makes the similarity level of the parameter in a second parameter comparison period most similar to the parameter of a first parameter comparison period based on the parameters stored in the parameter memory 173. In this case, the first parameter comparison period is a period containing the first comparison period and the first period immediately before the first comparison period. In addition, the second parameter comparison period is a period containing, when each of the multiple second periods included the post-implementation period is the to-be-compared candidate period, the to-be-compared period, and the second period immediately before the to-be-compared candidate period. The action of the first comparison-period specifier 134a and that of the second comparison-period specifier 134b will be explained later in detail.

The energy saving diagnoser 135 diagnoses the energy saving level derived from the implementation of the energy saving control based on the power consumption amount in the specified first comparison period by the first comparison-period specifier 134a and the power consumption amount in the specified second comparison period by the second comparison-period specifier 134b. More specifically, the energy saving diagnoser 135 calculates a difference between the power consumption amount prior to the implementation of the energy saving control and the power consumption amount after the implementation of the energy saving control.

The result outputter 136 outputs information indicating the calculated energy saving effect by the energy saving diagnoser 135 to the outputter 12.

First, the diagnosis-period obtainer 138 prompts, via the outputter 12, the user to input the pre-implementation period and the post-implementation period for diagnosis applied for the energy saving diagnosis process. Next, when the user has input the pre-implementation period and the post-implementation period, the diagnosis-period obtainer 138 stores the input periods in the diagnosis-period-time-interval memory 174.

Figure 8:
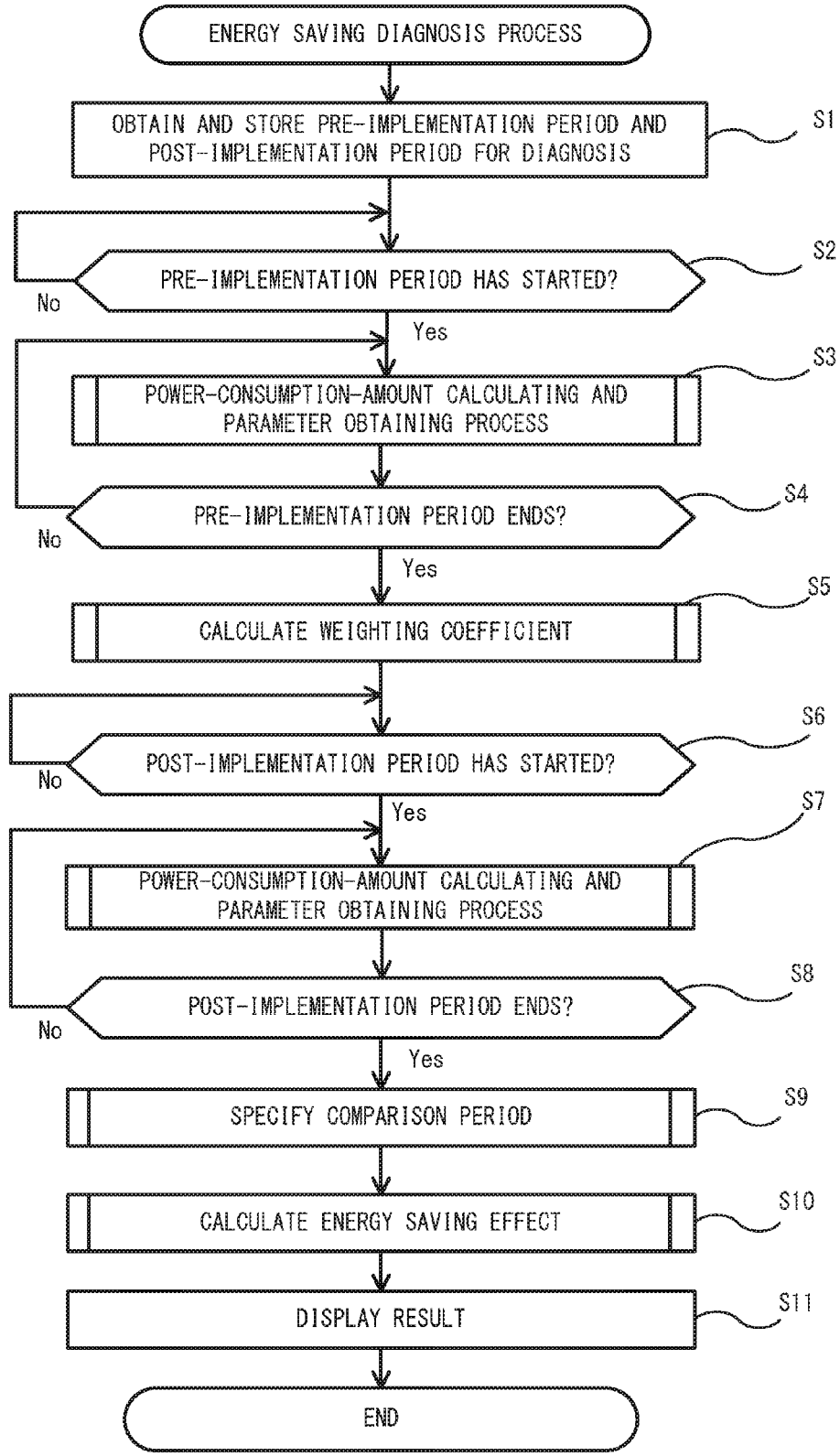
FIG. 8 is a flowchart illustrating an example flow of an energy saving diagnosis process according to the embodiment.

Next, an explanation will be given of the energy saving diagnosis process executed by the energy saving diagnosis apparatus 1 according to this embodiment with reference to FIG. 8. The energy saving diagnosis process illustrated in FIG. 8 starts upon, for example, an instruction input by the user via the inputter 11 to start the execution of the energy saving diagnosis process.

First, the diagnosis-period obtainer 138 obtains information indicating the pre-implementation period and the post-implementation period both input by the user, and stores the information indicating the obtained pre-implementation period and post-implementation period in the diagnosis-period-time-interval memory 174 (step S1).

Next, the current value obtainer 131 and the parameter obtainer 133 determine (step S2) whether or not the pre-implementation period prior to the energy saving control implementation to the air conditioner has started. More specifically, the current value obtainer 131 and the parameter obtainer 133 obtain, from the diagnosis-period-time-interval memory 174, period start time information for the pre-implementation period, and determine whether or not the time indicated by the obtained period start time information has arrived. The current value obtainer 131 and the parameter obtainer 133 maintain (step S2: NO) the stand-by status until the period start time for the post-implementation period arrives.

Conversely, in step S2, when the period start time for the post-implementation period comes (step S2: YES), the current value obtainer 131, the power-consumption-amount calculator 132, and the parameter obtainer 133 cooperatively execute (step S3) a power-consumption-amount calculating and parameter obtaining process. Hence, the power-consumption-amount calculator 132 calculates the power consumption amount by the air conditioner in the pre-implementation period, and stores the information indicating the calculated power consumption amount in the power-consumption-amount memory 172. In addition, the parameter obtainer 133 obtains the various parameters in the pre-implementation period, and stores the obtained parameters in the parameter memory 173. A power-consumption-amount calculating process will be explained later in detail.

Subsequently, the current value obtainer 131 and the parameter obtainer 133 determine (step S4) whether or not the pre-implementation period prior to the energy saving control implementation has ended. More specifically, the current value obtainer 131 and the parameter obtainer 133 obtain, from the diagnosis-period-time-interval memory 174, the end time for the pre-implementation period. The current value obtainer 131 determines whether or not the pre-implementation period has ended based on the comparison result between the period end time information for the pre-implementation period and the time information corresponding to the calculated power consumption amount. The parameter obtainer 133 determines whether or not the pre-implementation period has ended based on the comparison result between the period end time information for the pre-implementation period and the time information corresponding to the obtained parameter.

There is a case in which, in step S4, the current value obtainer 131 and the parameter obtainer 133 are assumed to determine that the pre-implementation period has not ended yet (step S4: NO). This is an example case in which the time elapsed from the time corresponding to the calculated power consumption amount (the time corresponding to the obtained parameter) by a certain time interval is before the period end time for the pre-implementation period. In this case, the current value obtainer 131, the power-consumption-amount calculator 132, and the parameter obtainer 133 cooperatively execute again the process in step S3.

Conversely, there is a case in which, in step S4, the current value obtainer 131 and the parameter obtainer 133 are assumed to determine that the pre-implementation period has ended (step S4: YES). This is an example case in which the time elapsed from the time corresponding to the calculated power consumption amount (the time corresponding to the obtainer parameter) by the certain time interval is after the period end time for the pre-implementation period. In this case, the coefficient setter 137 executes (step S5) a weighting-coefficient calculating process to calculate a weighting coefficient contained in a relational expression applied for a comparison-period specifying process to be explained later. The weighting-coefficient calculating process will be explained later in detail.

Subsequently, the current value obtainer 131 and the parameter obtainer 133 determine (step S6) whether or not the post-implementation period after the energy saving control implementation to the air conditioner has started. More specifically, the current value obtainer 131 and the parameter obtainer 133 obtain the period start time information for the post-implementation period from the diagnosis-period-time-interval memory 174, and determine whether or not the time indicated by the obtained period start time information has come.

In this case, the user is to implement the energy saving control to, for example, the air conditioner within a period after the pre-implementation period has ended and until the post-implementation period starts.

The current value obtainer 131 and the parameter obtainer 133 maintain the stand-by status until the period start time for the post-implementation period has come (step S6: NO). Conversely, in step S6, when the period start time for the post-implementation period has come (step S6: YES), the current value obtainer 131, the power-consumption-amount calculator 132, and the parameter obtainer 133 cooperatively execute (step S7) the power-consumption-amount calculating and parameter obtaining process. Hence, the power-consumption-amount calculator 132 calculates the power consumption amount by the air conditioner in the post-implementation period, and stores the information indicating the calculated power consumption amount in the power-consumption-amount memory 172. In addition, the parameter obtainer 133 obtains the various parameters in the post-implementation period, and stores the obtained parameters in the parameter memory 173.

Next, the current value obtainer 131 and the parameter obtainer 133 determine (step S8) whether or not the post-implementation period after the energy saving control implementation has ended. More specifically, similar to the above step 5, the current value obtainer 131 determines whether or not the post-implementation period has ended based on the comparison result between period end time information for the post-implementation period and the time information corresponding to the calculated power consumption amount. In addition, the parameter obtainer 133 determines whether or not the post-implementation period has ended based on the comparison result between the period end time information for the post-implementation period and the time information corresponding to the obtained parameter.

When determining in step S8 that the post-implementation period has not ended yet (step S8: NO), the current value obtainer 131, the power-consumption-amount calculator 132, and the parameter obtainer 133 cooperatively execute the process in step S7 again.

Conversely, when a determination is made in step S8 that the post-implementation period has ended (step S8: YES), the first comparison-period specifier 134a and the second comparison-period specifier 134b cooperatively execute (step S9) the comparison-period specifying process. Hence, the second comparison-period specifier 134b specifies, among the multiple to-be-compared candidate periods included the post-implementation period after the energy saving control implementation, the period having the similar parameter to that of the pre-implementation period prior to the energy saving control implementation, and registers the specified period as the second comparison period in the specific period table. The comparison-period specifying process will be explained later in detail.

Subsequently, the energy saving diagnoser 135 executes (step S10) an energy-saving-effect calculating process to calculate an effect value SDA indicating the energy saving effect derived from the implementation of the energy saving control to the air conditioner based on the specific period table written in the specific period memory 175. The energy-saving-effect calculating process will be explained later in detail.

Eventually, the result outputter 136 outputs (step S11) the effect value SDA stored in the diagnosis result memory 176 to the outputter 12.

Figure 9:
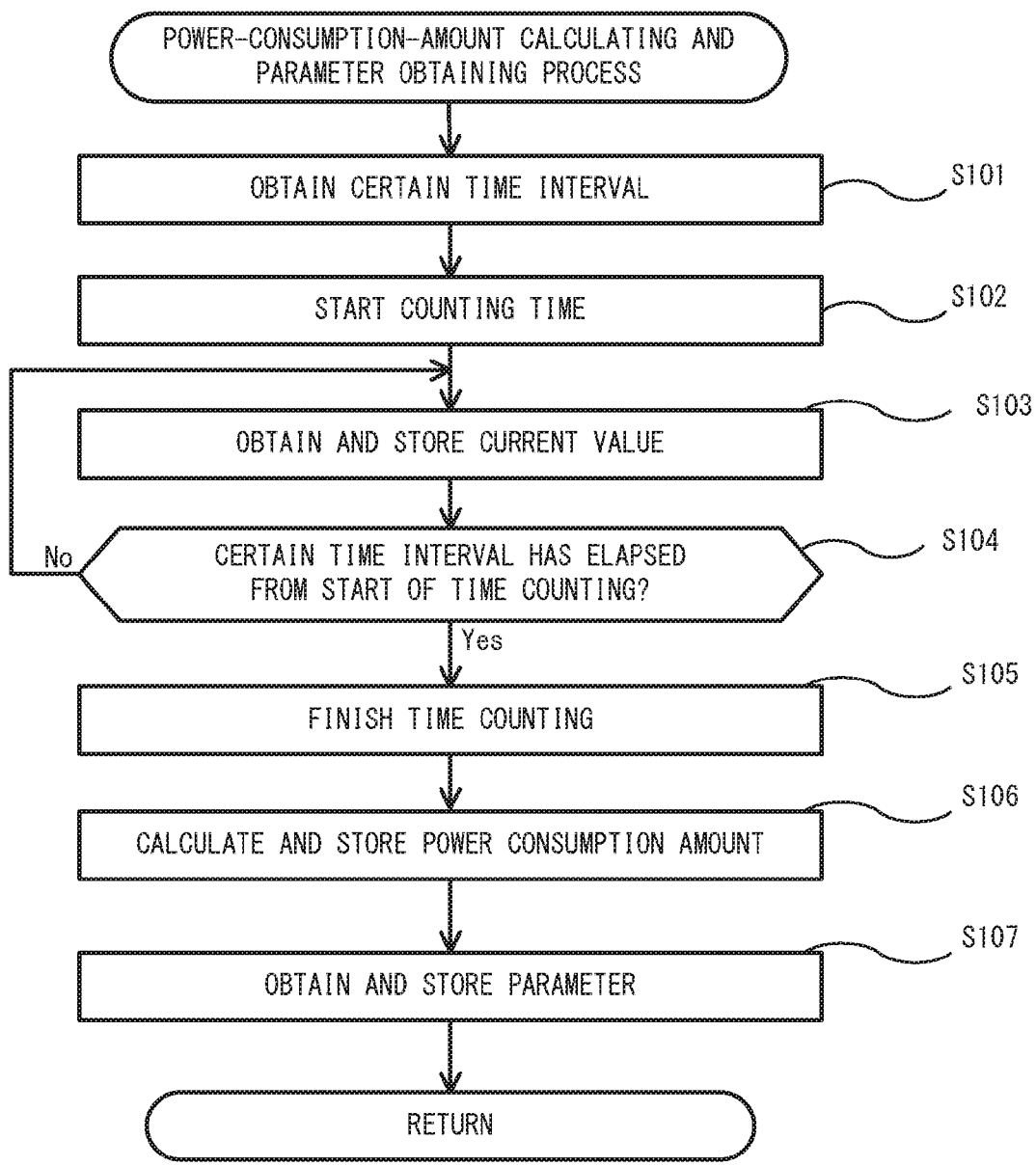
FIG. 9 is a flowchart illustrating an example flow of a power-consumption-amount calculating and parameters obtaining process according to the embodiment.

Next, an explanation will be given of the details of the power-consumption-amount calculating and parameter obtaining process (steps S3, S7) illustrated in FIG. 8 with reference to FIG. 9.

First, the power-consumption-amount calculator 132 obtains (S101) the information indicating the certain time interval from the diagnosis-period-time-interval memory 174, and starts counting a time (S102) by activating the timer 13a.

Subsequently, the current value obtainer 131 obtains the current value data from the respective ammeters 107, 207, and 307 via the air-conditioning communication network NT and the communicator 16, and stores the obtained current value data in the current value memory 171 (step S103). The current value obtainer 131 stores, the current value data obtained from the respective ammeters 107, 207, and 307 in the current value memory 171 in association with the respective air-conditioner systems G1, G2, and G3.

Next, the power-consumption-amount calculator 132 determines (step S104) whether or not the certain time interval has elapsed from the start of time counting by a certain time interval based on the counted value by the timer 13a.

When a determination is made in step S104 that the certain time interval has not elapsed yet from the start of the time counting (step S104: NO), the current value obtainer 131 executes the process in step S103 again.

Conversely, when a determination is made in step S104 that the certain time interval has elapsed from the start of the time counting (step S104: YES), the power-consumption-amount calculator 132 stops and resets the timer 13a, thereby ending the time counting (step S105).

Subsequently, the power-consumption-amount calculator 132 calculates, using the current value data within the certain time interval from the start of the time counting and until the end of the time counting, the power consumption amount by the air conditioner, and stores the calculated power consumption amount in the power-consumption-amount memory 172 (step S106).

The power-consumption-amount calculator 132 obtains, from the current value memory 171, the current value data stored in the current value memory 171 in association with the respective air-conditioner systems G1, G2, and G3. In addition, the power-consumption-amount calculator 132 calculates, for each air-conditioner system G1, G2, and G3, the power consumption amount.

Next, the parameter obtainer 133 obtains the various parameters from the air conditioner, and stores the obtained various parameters in the parameter memory 173 (step S107). In the example case illustrated in FIG. 6, for example, the parameter obtainer 133 obtains the parameters that are the suction temperature of the indoor unit 104, the operation status of the indoor unit 104, the outdoor temperature, the compressor operation frequency, and the indoor temperature. Next, the process returns to the energy saving diagnosis process again. The parameter obtainer 133 obtains the parameters for each air-conditioner system G1, G2, and G3, distinguishes the obtained parameters for each air-conditioner system G1, G2, and G3, and stores those parameters in the parameter memory 173.

Figure 10:
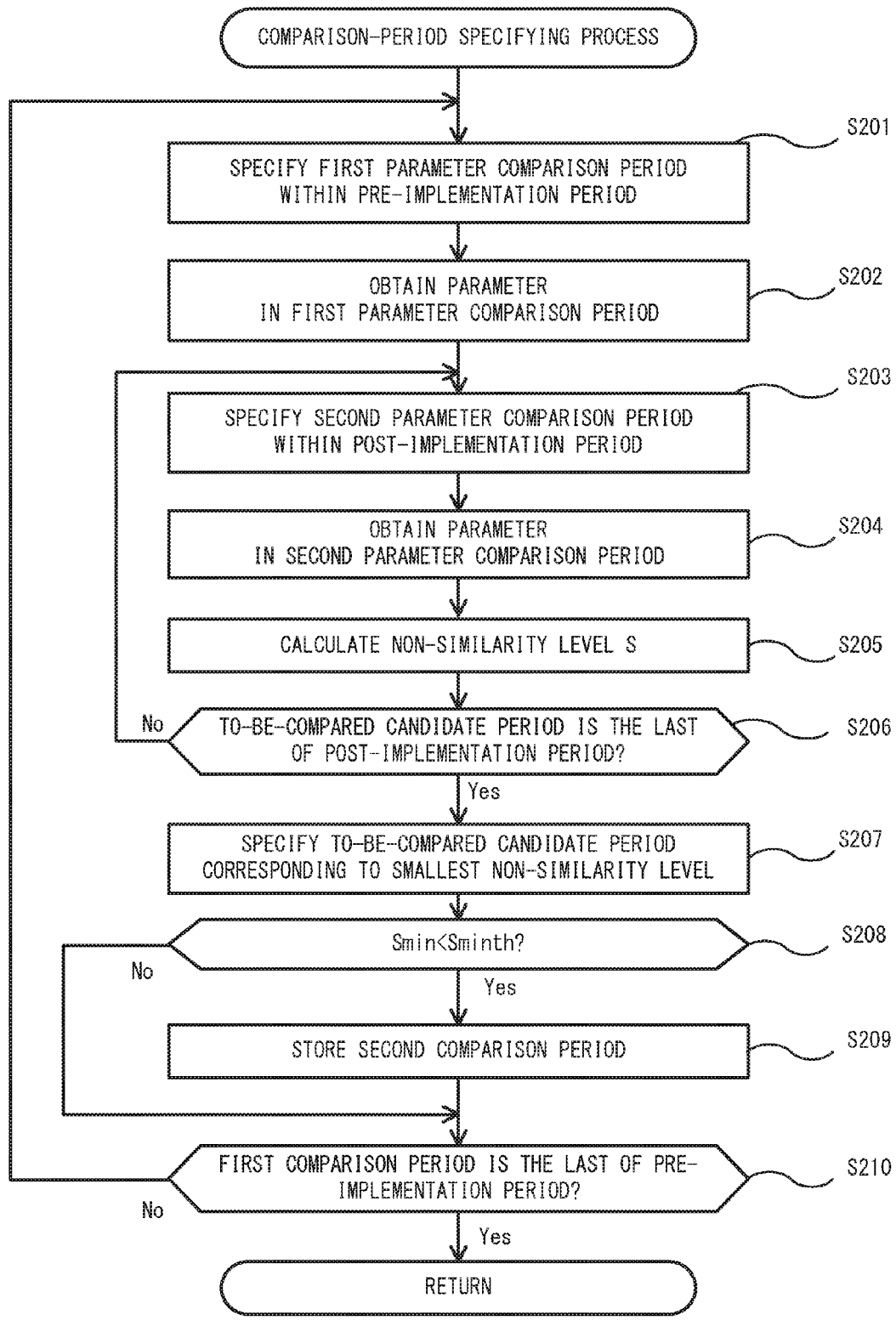
FIG. 10 is a flowchart illustrating an example flow of a comparison-period specifying process according to the embodiment.

Next, the details of the comparison-period specifying process (step S9) in FIG. 8 will be explained in detail with reference to FIG. 10 and FIGS. 11A and 11B.

First, the first comparison-period specifier 134a specifies (S201) the first parameter comparison period within the pre-implementation period. The first parameter comparison period is a period to specify the similar period to the first comparison period within the post-implementation period with a change in parameter before and after the first comparison period being taken into consideration. The first parameter comparison period may be set as, for example, a period containing the first comparison period, and the first period immediately before the first comparison period. The time length of the first comparison period is set as, for example, one day. The first parameter comparison period may be set as, for example, a period containing the specified first comparison period, and two days immediately before the first comparison period. In this case, the first comparison period may be set as date and time subsequent to the third day within the pre-implementation period.

As illustrated in FIG. 11A, when, for example, a period T3 is set as the first comparison period, a period containing the first comparison period T3, a period T1 and a period T2 prior to the first comparison period T2 is specified as the first comparison period.

Next, the second comparison-period specifier 134b obtains (step S202) the parameter of the specified first parameter comparison period from the parameter memory 173. When, for example, the time interval is set to be 30 minutes, and the first parameter comparison period is set to be three days, the second comparison-period specifier 134b obtains the 144 sets of parameters within the first parameter comparison period and is stored in the parameter memory 173.

Subsequently, the second comparison-period specifier 134b specifies (S203) the second parameter comparison period within the post-implementation period. The second parameter comparison period may be set as, for example, a period containing the to-be-compared candidate period and the two periods immediately before the to-be-compared candidate period. The second parameter comparison period is set to have the same length of time as that of the first parameter comparison period. In addition, as illustrated in FIG. 11A, the first parameter comparison period is assumed to set to be the period containing the first comparison period T3 and the periods T1 and T2 prior to the first comparison period T3. As illustrated in FIG. 11A, the second parameter comparison period in this case is set to be a period containing, when the to-be-compared candidate period is a period U3, the to-be-compared period U3 and periods U1 and U2 prior to the to-be-compared period U3.

Next, the second comparison-period specifier 134b obtains (step S204) the parameter of the specified second parameter comparison period from the parameter memory 173.

Subsequently, the second comparison-period specifier 134b calculates (step S205) the non-similarity level S using the obtained parameters. The second comparison-period specifier 134b calculates the non-similarity level S using the following relational formula (1) for a multiplication of the weighting coefficient to the absolute value of the difference in parameter between the specified first parameter comparison period and the specified second parameter comparison period, and for an addition.

$$S = w_{00}|a_{00}(T) - b_{00}(U)| + w_{10}|a_{10}(T) - b_{10}(U)| + \ldots + w_{NM}|a_{NM}(T) - b_{NM}(U)| \quad (1)$$

where S is the non-similarity level, $a_{ij}(T)$ (where i=0, 1, 2, ..., N; j=0, 1, 2, ..., M) is the parameter of the specified first parameter comparison period, $b_{ij}(U)$ (where i=1, 2, ..., N; j=0, 1, 2, ..., M) is the parameter of the specified second parameter comparison period, and $w_{ij}$ (where i=0, 1, 2, ..., N; j=0, 1, 2, ..., M) is the weighting coefficient. The value of each weighting coefficient $w_{ij}$ (where i=1, 2, ..., N; j=0, 1, 2, ..., M) is selected in such a way that the total of those values becomes a constant value (for example, "1"). The term i is an identification number to identify the type of the parameter. The term N is equivalent to the number of types of the parameter. The term j is an identification number to identify the relative time within the first parameter comparison period or the second parameter comparison period. The term j is equivalent to the sequential order of each period from the top position when the first parameter comparison period or the second parameter comparison period is equally divided into M pieces and arranged in sequence in the time-series manner. In addition, the term T indicates the first comparison period, and the term U indicates the to-be-compared candidate period. The smaller the non-similarity level S is, the higher the similarity of the parameter becomes.

When, for example, the first parameter comparison period and the second parameter comparison period are assumed to have the respective lengths of time that are three days, and as illustrated in FIG. 6, it is assumed that there are five types of parameters, and the time interval is 30 minutes (0.5 hours), the number N for the types of parameters is five, and the first parameter comparison period and the second parameter comparison period are each equally divided into 144 pieces that are expressed as (24 (hours)/0.5 (hours))×3 (days).

In addition, the weighting coefficient wi is calculated through the weighting-coefficient calculating process (see step S5 in FIG. 8) executed by the coefficient setter 137.

Next, the second comparison-period specifier 134b determines (step S206) whether or not the to-be-compared candidate period contained in the specified second parameter comparison period is the last period in the post-implementation period.

When a determination is made in step S206 that the to-be-compared candidate period is not the last period in the post-implementation period (step S206: NO), the second comparison-period specifier 134b executes the process in step S203 again. In this case, the second comparison-period specifier 134b specifies, as the second parameter comparison period, the second parameter comparison period that contains the to-be-compared candidate period immediately after the to-be-compared candidate period contained in the second parameter comparison period specified immediately before.

When, for example, as illustrated in FIG. 11A, the second comparison-period specifier 134b has specified immediately before the second parameter comparison period that contains the second comparison period U3, the second comparison-period specifier 134b specifies the second parameter comparison period containing a second comparison period U4. That is, the second comparison-period specifier 134b specifies, as the second parameter comparison period, the period that contains the second comparison period U4, and periods U2 and U3 prior to the second comparison period U4. Subsequently, every time the processes from step S203 to step S206 are repeated, the second comparison-period specifier 134b specifies the second parameter comparison period in such a way that the to-be-compared candidate period contained in the second parameter comparison period is shifted backwards over the time axis such as U5, U6, and the like (see solid arrows in FIG. 11A). Hence, for example, the non-similarity levels between each parameter of the first parameter comparison period T1 to T3 and those of the multiple second parameter comparison periods U1 to U3, U2 to U4, and the like are calculated.

Conversely, when a determination is made in step S206 that the to-be-compared candidate period is the last period in the post-implementation period (step S206: YES), the second comparison-period specifier 134b specifies (step S207) the to-be-compared candidate period corresponding to the minimum non-similarity level S. More specifically, the second comparison-period specifier 134b specifies the second parameter comparison period that has a minimum non-similarity level Smin based on the time-series of the respective non-similarity levels S of the first parameter comparison periods each containing the first comparison period. Next, the second comparison-period specifier 134b specifies the to-be-compared candidate period contained in the specified second parameter comparison period.

Figure 11D:
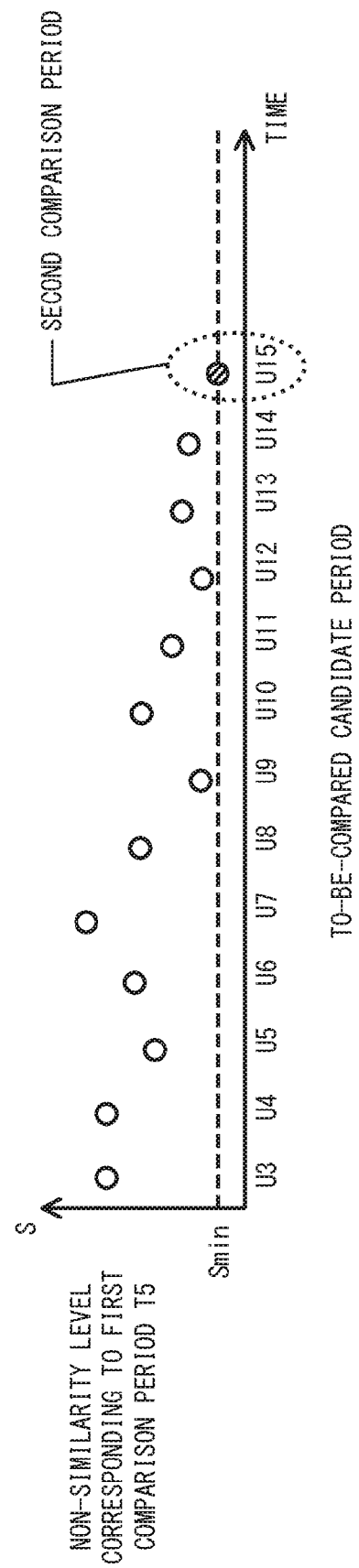
FIG. 11D is a diagram for explaining the comparison-period specifying process according to the embodiment.

When, for example, the time-series of the non-similarity levels S corresponding to the first comparison period T3 as illustrated in FIG. 11B is calculated, the second comparison-period specifier 134b specifies a to-be-compared candidate period U12. In addition, when the time-series of the non-similarity levels S corresponding to first comparison periods T4 and T5 as illustrated in FIGS. 11C and 11D are respectively calculated, the second comparison-period specifier 134b specifies to-be-compared candidate periods U6 and U15, respectively.

Subsequently, the second comparison-period specifier 134b determines (step S208) whether or not the minimum non-similarity level Smin is smaller than a minimum non-similarity level threshold Sminth set beforehand. The minimum non-similarity level threshold Sminth is set by the user based on, for example, the empirical value of the non-similarity level when the parameter is similar.

When a determination is made in step S208 that the minimum non-similarity level S is equal to or greater than the minimum non-similarity level threshold Sminth (step S208: NO), the second comparison-period specifier 134b determines that there is no similar period to the specified first comparison period within the post-implementation period. Next, the second comparison-period specifier 134b immediately executes the process in step S210 to be explained later.

Conversely, when a determination is made in step S208 that the minimum non-similarity level S is smaller than the minimum non-similarity level threshold Sminth (step S208: YES), the second comparison-period specifier 134b stores (step S209), as the second comparison period, the specified to-be-compared candidate period in the specific period memory 175, and executes the process in step S210.

The first comparison-period specifier 134a determines in step S210 whether or not the specified first comparison period is the last period in the post-implementation period.

When a determination is made in step S210 that the specified first comparison period is not the last period in the pre-implementation period (step S210: NO), the first comparison-period specifier 134a executes the process in step S201 again. In this case, the first comparison-period specifier 134a specifies, as the first comparison period, the first comparison period immediately after the first comparison period specified immediately before. Next, the process returns to the energy saving diagnosis process again.

When, for example, as illustrated in FIG. 11A, the first comparison-period specifier 134a has specified the first comparison period T3 immediately before, the first comparison-period specifier 134a specifies the first comparison period T4. In addition, the first comparison-period specifier 134a specifies, as the first parameter comparison period, a period that contains the first comparison period T4, and the periods T2 and T3 prior to the first comparison period T4. Subsequently, every time the processes from step S203 to step S206 are repeated, the first comparison-period specifier 134a specifies the second parameter comparison period in such a way that the first comparison period is shifted backwards over the time axis such as T5, T6, and the like. Hence, the second comparison-period specifier 134b calculates, for each of the multiple first comparison periods (for example, T3, T4, and T5), the time-series of the non-similarity level S (see solid line arrows and dot-chain line arrows in FIG. 11A).

Figure 12:
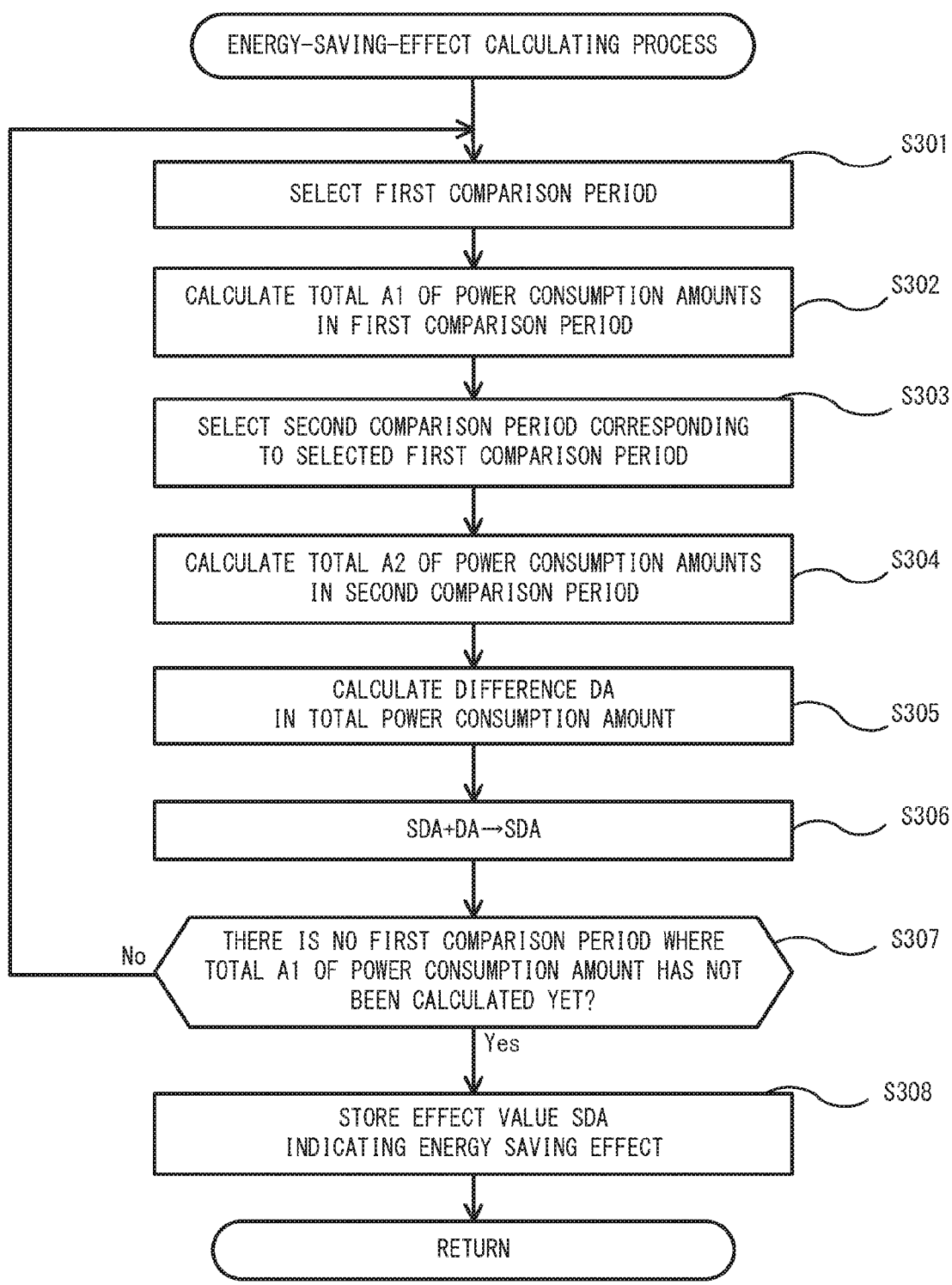
FIG. 12 is a flowchart illustrating an example flow of an energy-saving-effect calculating process according to the embodiment.

Next, an explanation will be given of the details of the energy-saving-effect calculating process (step S10) in FIG. 8 with reference to FIG. 12.

First, the energy saving diagnoser 135 selects (S301) the first comparison period within the pre-implementation period.

Next, the energy saving diagnoser 135 calculates (step S302) a total A1 of the power consumption amounts within the selected first comparison period. More specifically, the energy saving diagnoser 135 obtains all information indicating the respective power consumption amounts at the systems G1, G2, and G3 in the selected first comparison period from the power-consumption-amount memory 172. Next, the energy saving diagnoser 135 calculates the total A1 of the power consumption amounts in the first comparison period for the respective systems G1, G2, and G3 based on the obtained information. When, for example, "5/3" is selected as the first comparison period, the energy saving diagnoser 135 calculates the total A1 of the power consumption amounts from "5/3 0:00" to "5/3 24:00".

Subsequently, the energy saving diagnoser 135 selects (S303) the second comparison period corresponding to the selected first comparison period. The "corresponding second comparison period" is equivalent to the second comparison period that is registered in the specific period table, and which has a similar parameter to that of the first comparison period. When, for example, the specific period table illustrated in FIG. 7 is stored in the specific period memory 175, the energy saving diagnoser 135 selects, for the first system G1, "6/12" as the second comparison period corresponding to the first comparison period that is "5/3".

Next, the energy saving diagnoser 135 calculates (step S304) a total A2 of the power consumption amounts in the selected second comparison period. More specifically, the energy saving diagnoser 135 obtains all information indicating the respective power consumption amounts at the systems G1, G2, and G3 in the selected second comparison period from the power-consumption-amount memory 172. Subsequently, the energy saving diagnoser 135 calculates, for the respective systems G1, G2, and G3, the total A2 of the power consumption amounts in the second comparison period based on the obtained information.

Subsequently, the energy saving diagnoser 135 calculates (step S305) a difference DA (=A1-A2) between the power-consumption-amount totals A1 and A2.

Next, the energy saving diagnoser 135 is assumed to obtain a new effect value SDA that is obtained by adding the difference DA to the effect value SDA indicating the energy saving effect (step S306). In this case, the energy saving diagnoser 135 first obtains the effect value SDA stored previously in the diagnosis result memory 176, and temporarily stores the obtained effect value SDA in the work area of the RAM 15. Subsequently, the energy saving diagnoser 135 updates the effect value SDA stored in the work area of the RAM 15 every time the process in step S306 is executed.

Next, the energy saving diagnoser 135 determines (step S307) whether or not there is the first comparison period where the total A1 of the power consumption amounts has not been calculated yet.

When a determination is made in step S307 that there is still the first comparison period where the total A1 of the power consumption amounts has not been calculated yet (step S307: NO), the energy saving diagnoser 135 executes the process S301 again.

Conversely when a determination is made in step S307 that there is no first comparison period where the total A1 of the power consumption amounts has not been calculated yet (step S307: YES), the energy saving effect diagnoser 135 stores the effect value SDA in the diagnosis result memory 176. In this case, the energy saving diagnoser 135 stores, in the diagnosis result memory 176, the effect value SDA temporarily stored in the work area of the RAM 15. Next, the process returns to the energy saving diagnosis process again.

Figure 13:
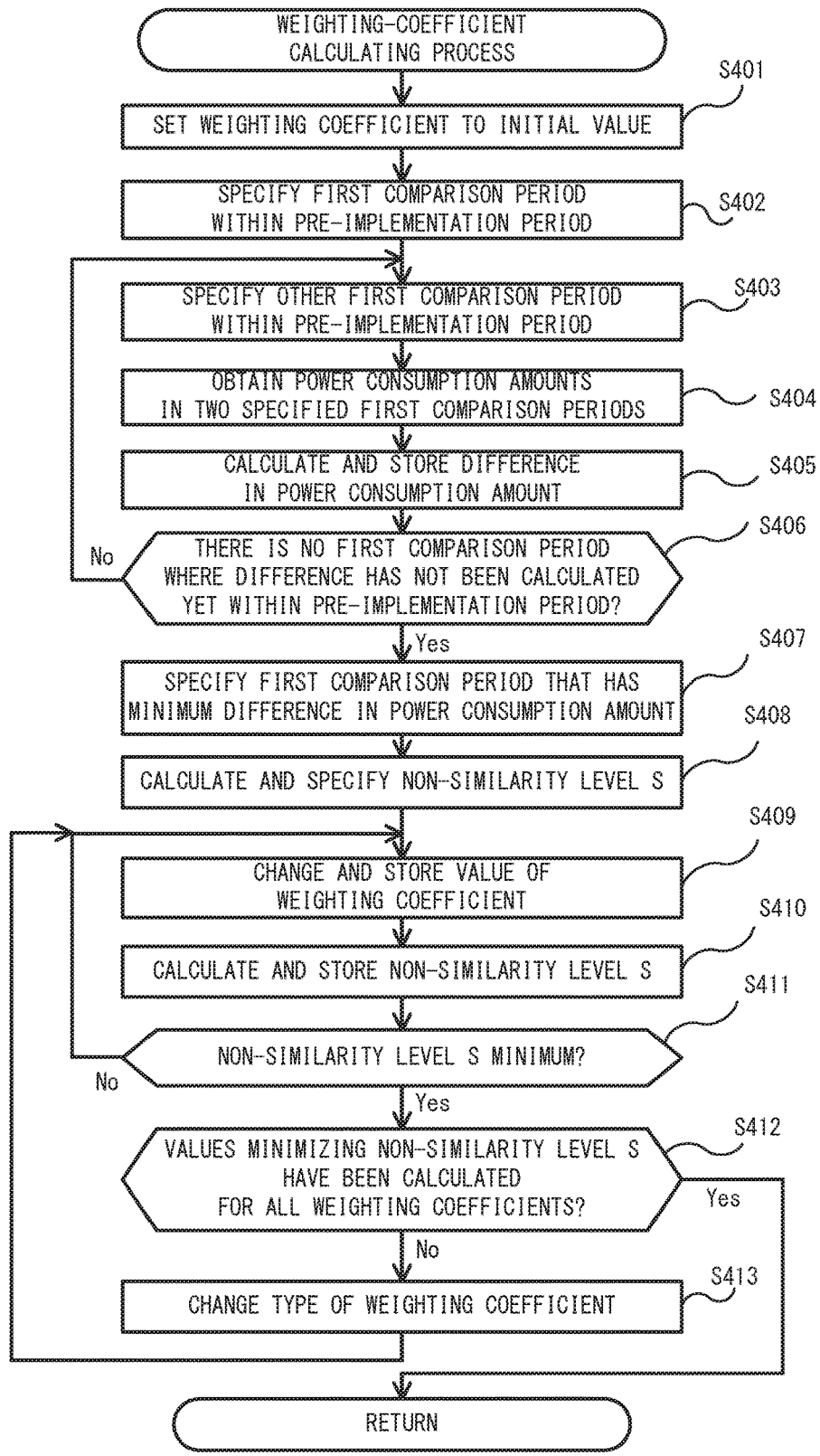
FIG. 13 is a flowchart illustrating an example flow of a weighting-coefficient calculating process according to the embodiment.

Subsequently, an explanation will be given of the details of the weighting-coefficient calculating process (step S5) in FIG. 8 with reference to FIG. 13.

First, the coefficient setter 137 sets (step S401) the weighting coefficient contained in the above relational formula (1) to be an initial value. The initial value of the weighting coefficient may be stored in the weighting-coefficient calculation memory 177 by the user via the inputter 11.

Next, the coefficient setter 137 specifies (S402) the first period within the pre-implementation period. The coefficient setter 137 specifies, for example, the foremost first period in the pre-implementation period.

Subsequently, the coefficient setter 137 specifies (step S403) the other first period within the pre-implementation period. The coefficient setter 137 specifies, when, for example, the foremost first period has been specified in step S402, the first period located in the second position from the foremost first period.

Subsequently, the coefficient setter 137 obtains (step S404), from the power-consumption-amount memory 172, the power consumption amounts of the two specified first periods.

Next, the coefficient setter 137 calculates the difference in power consumption amount between the two specified first periods, and stores the calculated difference in the weighting-coefficient calculation memory 177 (step S405).

Subsequently, the coefficient setter 137 determines (step S406) whether or not there is the first period where the difference in power consumption amount has not been calculated yet within the pre-implementation period. When, for example, the coefficient setter 137 is assumed to calculate the difference in power consumption amount while shifting the first period backwards over the time axis from first period located at the second position from the foremost first period in the pre-implementation period in sequence, the coefficient setter 137 determines whether or not the first period having undergone the calculation of the difference in power consumption amount is the last period in the pre-implementation period.

When a determination is made in step S406 that there is the first period where the difference in power consumption amount has not been calculated yet (step S406: NO), the coefficient setter 137 executes the process in step S403 again. In this case, the coefficient setter 137 specifies the first period located backwardly over the time axis and adjacent to the first period specified immediately before.

Conversely, when a determination is made in step S406 that there is no first period where the difference in power consumption amount has not been calculated yet (step S406: YES), the coefficient setter 137 specifies (step S407) the first period where the difference in power consumption amount is minimum.

Subsequently, the coefficient setter 137 calculates the non-similarity level S using the above relational formula (1), and stores the calculated non-similarity level S to the weighting-coefficient calculation memory 177 (step S408). The calculation method of the non-similarity level S is the same as that of the process in step S205 in the comparison-period specifying process.

Next, the coefficient setter 137 changes the value of the weighting coefficient, and stores the changed minimum similarity level Smin in the weighting-coefficient calculation memory 177 (step S409). In this case, the coefficient setter 137 selects one of the multiple weight coefficients, increases (decreases) the value of the selected weighting coefficient, and decreases (increases) the value of the other weighting coefficient at the same rate, thereby obtaining the constant total of the multiple weighting coefficients. In addition, the coefficient setter 137 monotonically increases or decreases the selected weighting coefficient so as to decrease the non-similarity level S.

Subsequently, the coefficient setter 137 calculates the non-similarity level S again using the above relational formula (1), and stores the calculated non-similarity level S in the weighting-coefficient calculation memory 177 (step S410).

Next, the coefficient setter 137 determines (step S411) whether or not the calculated non-similarity level S using the weighting coefficient prior to the change is minimum More specifically, the coefficient setter 137 compares the non-similarity level S which is stored in the weighting-coefficient calculation memory 177 and which is calculated using the value of the weighting coefficient prior to the change with the newly calculated non-similarity level S. Next, when the calculated non-similarity level S using the value of the weighting coefficient prior to the change is smaller than the newly calculated non-similarity level S, a determination is made that the calculated non-similarity level S using the value of the weighting coefficient prior to the change is minimum.

When a determination is made in step S411 that the calculated non-similarity level S using the value of the weighting coefficient prior to the change is not minimum (step S411: NO), the coefficient setter 137 executes the process in step S409 again.

Conversely, when a determination is assumed to be made in step S411 that the calculated non-similarity level S using the value of the weighting coefficient prior to the change is minimum (step S411: YES), the coefficient setter 137 determines (step S412) whether or not the value that minimizes the non-similarity level S has been calculated for all weighting coefficients. That is, a determination is made on whether or not the value that minimizes the non-similarity level S has been specified for all weighting coefficients wi (where i=1, 2, ..., N).

When a determination is made in step S412 that there is still the weighting coefficient which has the value minimizing the non-similarity level S has not been calculated yet (step S412: NO), the coefficient setter 137 changes (step S413) the type of the weighting coefficient, and executes the process in step S409 again. The coefficient setter 137 executes the process in step S409 with, for example, a weighting coefficient w1 being changed to a weighting coefficient w2. Conversely, when a determination is made in step S412 on whether or not the value that minimizes the non-similarity level S has been calculated for all weighting coefficients (step S412: YES), the process returns to the energy saving diagnosis process again.

In the meantime, the power consumption amount by the air conditioner may vary depending on the past parameters. For example, the power consumption amount by the air conditioner on a given day may vary depending on the environmental parameters such as the weather condition on the previous day or the operation parameter thereon indicating the operation status of the air conditioner, and the like.

In contrast, according to the energy saving diagnosis apparatus 1 in this embodiment, the first comparison-period specifier 134a specifies the first parameter comparison period containing the first period immediately before the first comparison period. Next, the second comparison-period specifier 134b specifies the second comparison period contained in the second parameter comparison period corresponding to the most similar parameter to that of the specified first parameter comparison period. That is, the first comparison-period specifier 134a and the second comparison-period specifier 134b take into consideration an immediate change in parameter of each first comparison period and that of each to-be-compared candidate periods, and specify the second comparison period that has a similar parameter to that of the first comparison period. This improves the similarity level in parameter between the first comparison period and the second comparison period, and thus the improvement of the estimation accuracy for the energy saving effect is accomplishable.

In addition, the power consumption amount by the air conditioner also depends on, in addition to a change in environmental parameters indicating the environment where the air conditioner is installed such as the outdoor temperature and the outdoor humidity, a change in operation parameter such as the operation status of the air conditioner. When, for example, the air conditioner is installed in an office, since the air conditioner is stopped on Sunday or the like that is a non-work day, the thermal load to the air conditioner is likely to increase on Monday that is the next day to such Sunday in comparison with each weekday from Tuesday to Friday, and the power consumption amount tends to increase.

In contrast, according to the energy saving diagnosis apparatus 1 in this embodiment, the parameters contain the operation parameter indicating the operation status of the air conditioner. Hence, a change in operation parameter of the air conditioner in each first comparison period and in each to-be-compared candidate period is taken into consideration, and the second comparison period that has the similar parameter to the first comparison period is specified. Accordingly, since a second comparison period appropriate as the to-be-compared first comparison period, the estimation accuracy of the energy saving effect is improved.

Still further, according to the energy saving diagnosis apparatus 1 in this embodiment, as indicated by the above relational formula (1), the second comparison-period specifier 134b specifies the second comparison period based on the difference in parameter and the weighting coefficient wi in accordance with each parameter. That is, the adverse effect of the parameter in each first comparison period and in each second comparison period to the power consumption amount by the air conditioner is taken into consideration, and the second comparison period that has a similar parameter to that of the first comparison period is searched. This specifies a second comparison period appropriate as a target for comparison with the first comparison period, and thus the improvement of the estimation accuracy of the energy saving effect is accomplishable.

Meanwhile, in the two first comparison periods within the pre-implementation period, when the difference in power consumption amount is small, that is, when the power consumption amount is similar, the parameters of both the first comparison periods may be considered as substantially the same. Hence, according to the energy saving diagnosis apparatus 1 in this embodiment, the weighting coefficient in the above relational formula (1) is determined in such a way that the non-similarity level S is minimized which is calculated using the parameters of the two first comparison periods that have the minimum difference in power consumption amount within the pre-implementation period. This enables a setting of the weighting coefficient based on the parameter in the pre-implementation period, and thus the above relational formula (1) is made appropriate with the parameters in the pre-implementation period being taken into consideration.

The embodiment of the present disclosure has been explained above, but the present disclosure is not limited to the above embodiment.

In the comparison-period specifying process according to the embodiment, the first comparison-period specifier 134a may specify the first parameter comparison period that contains the first comparison period and the first period immediately after this first comparison period. In this case, the second comparison-period specifier 134b may specify, as the second parameter comparison period, a period that contains the to-be-compared candidate period and the second period immediately after this to-be-compared period. For example, the first comparison-period specifier 134a is assumed to specify, as the first parameter comparison period, a period that contains the first comparison period and two days immediately after this first comparison period. In this case, the second comparison-period specifier 134b may specify, as the second parameter comparison period, the period that contains the to-be-compared candidate period and two days immediately after this to-be-compared period.

Alternatively, in the comparison-period specifying process, the first comparison-period specifier 134a may specify, as the first parameter comparison period, a period that contains the first comparison period and the first periods immediately before and immediately after this first comparison period. In this case, the second comparison-period specifier 134b may specify, as the second parameter comparison period, a period that contains the to-be-compared candidate period and the second periods immediately before and immediately after the to-be-compared period. For example, the first comparison-period specifier 134a is assumed to specify, as the first parameter comparison period, the period that contains the first comparison period and respective one day immediately before and immediately after this first comparison period. In this case, the second comparison-period specifier 134b may specify, as the second parameter comparison period, the period that contains the to-be-compared candidate period and respective one day immediately before and immediately after this to-be-compared period.

According to this configuration, the second comparison-period specifier 134b specifies the second comparison period that has a similar parameter to that of the first comparison period in consideration of a future change in parameters of each first comparison period and of each second comparison period. Hence, an appropriate second comparison period as the to-be-compared period with the first comparison period is specified, improving the estimation accuracy of the energy saving effect.

In the embodiment, the controller 13 may employ a configuration that has no current-value obtainer 131, power-consumption-amount calculator 132, and parameter obtainer 133. In this case, the power consumption amount and the parameter may be stored in the power-consumption-amount memory 172 and the parameter memory 173, respectively, beforehand.

In the comparison-period specifying process according to the embodiment, the second comparison-period specifier 134b may adopt, as the non-similarity level, a square sum of the difference between various parameters of the specified first comparison period and various parameters of the respective multiple second comparison periods. Alternatively, the second comparison-period specifier 134b may adopt, as the non-similarity level, a Euclidean distance between the specified first comparison period and each of the multiple second comparison periods within an Euclidean space formed by various parameters of the first comparison period and of the second comparison period.

In the weighting-coefficient calculating process according to the embodiment, the coefficient setter 137 may specify the two second periods that have the minimum difference in power consumption amount within the post-implementation period. In addition, the coefficient setter 137 may determine the weighting coefficient wi (where i=1, 2, . . . , N) so as to minimize the non-similarity levels between the respective parameters of the two specified second periods.

According to this embodiment, the value of the weighting coefficient can be set based on the parameter in the post-implementation period, and thus the relational formula (1) can be made appropriate with the parameter in the post-implementation period being taken into consideration.

In the embodiment, the remote control terminals 105 and 205 may be connected to multiple outdoor units, respectively.

In the embodiment, a blower fan or various sensors such as a temperature sensor may be connected to the energy saving diagnosis apparatus 1 via the air-conditioning communication network NT. In this case, the blower fan and the temperature sensor are capable of sending action information and indoor temperature information to the air-conditioning communication network NT, respectively. In addition, the parameter obtainer 133 is capable of obtaining the parameters, such as the action information on the blower fan and the indoor temperature information such as the temperature sensor, from the air-conditioning communication network NT via the communicator 16, making those parameters available for the second comparison-period specifier 134b.

In the embodiment, the power-consumption-amount calculator 132 may calculate the power consumption amount based on the current value data obtained from the ammeter individually interposed in, for example, the power supply line for the outdoor unit 103 or the indoor unit 104. According to this configuration, since the power consumption amount by the outdoor unit 103, and the power consumption amount by the indoor unit 104 are respectively calculated, and thus energy saving diagnoses on each of the outdoor unit 103 and the indoor unit 104 can be performed.

In the embodiment, the power-consumption-amount calculator 132 may obtain the power consumption amount by the air conditioner based on, for example, the operation status of the air conditioner, and may store the obtained power consumption amount in the power-consumption-amount memory 172. For example, the air conditioner is assumed to have multiple types of operation modes. Conversely, the power-consumption-amount calculator 132 is assumed to hold the power-consumption-amount table that registers the multiple types of operation modes in association with respective average power consumption amounts corresponding to the respective operation modes. In this case, the power-consumption-amount calculator 132 is capable of obtaining the operation mode of the air conditioner via the air-conditioning communication network NT from the air conditioner, referring to the power-consumption-amount table, and storing the average power consumption amount corresponding to the obtained operation mode in the power-consumption-amount memory 172.

According to this configuration, the process load to the power-consumption-amount calculator 132 can be reduced.

In the embodiment, the parameter obtainer 133 may obtain the parameter from sensors that are installed outside and inside the building H separately from the air conditioner, and that measure, for example, a temperature, a humidity, a carbon dioxide concentration, and a illuminance. In this case, when each sensor is connected to the air-conditioning communication network NT, temperature information, humidity information, carbon dioxide concentration information, and illuminance information can be sent to the air-conditioning communication network from the respective sensors. In addition, the parameter obtainer 133 is capable of obtaining parameters, such as the temperature information, the humidity information, the carbon dioxide concentration information, and the illuminance information, from the air-conditioning communication network NT via the communicator 16, making those parameters available for the second comparison-period specifier 134b.

According to this configuration, even if the air conditioner lacks the function of sending the information obtained by each sensor of the local air conditioner to the air-conditioning communication network NT, the parameter obtainer 133 is capable of obtaining the various parameters.

In the embodiment, the parameter obtainer 133 may obtain, for example, open information available from a weather bureau via, for example, the Internet. In this case, the parameter obtainer 133 is capable of obtaining weather information (for example, outdoor temperature) available to the public from, for example, the website of a weather bureau, and storing the obtained weather information in the parameter memory 173.

In the embodiment, the first comparison-period specifier 134a may specify the first comparison period from the post-implementation period, and the second comparison-period specifier 134b may specify the second comparison period from the pre-implementation period. In addition, in the embodiment, a clock that counts a time at a certain time in every day may be provided, and every time the clock counts the certain time in the post-implementation period, the first comparison-period specifier 134a may specify, as the first comparison period, a day immediately before the certain time. Still further, the second comparison-period specifier 134b may specify the second comparison time period similar to the first comparison time period from the pre-implementation time period, and the energy saving diagnoser 135 may diagnose the energy saving effect.

The energy saving diagnosis apparatus 1 according to the present disclosure is accomplishable by not only a dedicated system but also by a normal computer system. For example, a program that causes a computer connected to a network to execute the above actions may be distributed in a manner stored in a non-transitory computer readable recording medium (for example, a CD-ROM), and the energy saving diagnosis apparatus 1 that executes the above processes may be formed by installing the program in the computer system.

How to provide such a program to a computer is optional. For example, the program may be uploaded to a Bulletin Board System (BBS) over a communication line, and may be distributed to the computer via the communication line. The computer launches this program, and executes likewise the other application programs under the control of an OS. This enables the computer to function as the energy saving diagnosis apparatus 1 that executes the above processes.

The embodiment of the present disclosure and the modifications thereof (including noted configurations, the same is true of the following explanation) have been explained, but the present disclosure is not limited to those. The present disclosure includes an appropriate combination of the embodiment and the modifications, and such a combination to which a further modification is made.

INDUSTRIAL APPLICABILITY

The present disclosure is suitably applicable to an energy saving diagnosis apparatus, an energy saving diagnosis method, a program, and the like to diagnose the energy saving level before and after the energy saving control implementation to an air conditioner.

REFERENCE SIGNS LIST

1 Energy saving diagnosis apparatus
6 Power supply
11 Inputter
12 Outputter
13 Controller
13a Timer 14 ROM
15 RAM
16 Communicator
17 Storage device
31 Outdoor temperature sensor
32 Outdoor humidity sensor
33 Outdoor illuminance sensor
34 Outdoor unit communicator
35 Compressor
36 Outdoor unit controller
41 Indoor unit memory
42 Suction temperature sensor
43 Indoor unit communicator
44 Indoor unit controller
51 Indoor temperature sensor
52 Indoor humidity sensor
53 Indoor illuminance sensor
54 Remote control terminal communicator
55 Operation part
56 Remote control terminal controller
103, 203 Outdoor unit
104, 204 Indoor unit
105, 205 Remote control terminal
107, 207, 307 Ammeter
131 Current value obtainer
132 Power-consumption-amount calculator
133 Parameter obtainer
134a First comparison-period specifier
134b Second comparison-period specifier
135 Energy saving diagnoser
136 Result outputter
137 Coefficient setter
138 Diagnosis-period obtainer
171 Current value memory
172 Power-consumption-amount memory
173 Parameter memory
174 Diagnosis-period-interval memory
175 Specific period memory
176 Diagnosis result memory
177 Weighting-coefficient calculation memory
G1 First system
G2 Second system
G3 Third system
H Building
L1, L2 Signal line
NT Air-conditioning communication network
PL1, PL2, PL3 Power supply line

The invention claimed is:

1. An energy saving diagnosis apparatus, comprising:
a controller configured to implement:
a first to-be-compared period specifier configured to specify a first to-be-compared period among first periods that include one period of a pre-implementation period and a post-implementation period, the pre-implementation period being before implementation of an energy saving control with an air conditioner, the post-implementation period being after the implementation of the energy saving control with the air conditioner;
a second to-be-compared period specifier configured to specify, when each of second periods that include another period of the pre-implementation period and the post-implementation period is a to-be-compared candidate period, as a second to-be-compared period, based on a parameter history indicating an environment or an operation status of the air conditioner, a to-be-compared candidate period having a highest similarity level between
1) parameters in a first parameter comparison period including the first to-be-compared period and a first period, among the first periods, immediately before or after the first to-be-compared period, and
2) parameters in a second parameter comparison period including the to-be-compared candidate period and a second period, among the second periods, immediately before or after the to-be-compared candidate period;
a coefficient setter configured to set the weighting coefficient for each parameter, the coefficient setter is configured to:
specify two first periods, among the first periods, having a minimum difference in power consumption amounts, or two second periods, among the second periods, having a minimum difference in power consumption amounts; and
set, for each parameter, the weighting coefficient for each parameter in such a way that, when the value obtained by multiplying (i) the difference between the parameters of one period of the two first periods and the parameters of another period of the two first periods, or (ii) the difference between the parameters of one period of the two second periods and the parameters of another period of the two second periods, by the weighting coefficient is obtained, a total value of the values obtained for each parameter is minimum; and
an energy saving diagnoser configured to diagnose, based on a power consumption amount in the first to-be-compared period and a power consumption amount in the second to-be-compared period, a level of energy saving derived from the implementation of the energy saving control, wherein
the parameter history is a history of parameters; and
the second to-be-compared period specifier is configured to:
obtain, for each of the parameters, a value obtained by multiplying a difference between the parameters in the first parameter comparison period and the parameters in the second parameter comparison period by a weighting coefficient for each parameter; and
specify as the second to-be-compared period a to-be-compared candidate period having a smallest total value of the values obtained for each parameter.

2. An energy saving diagnosis method comprising steps of:
specifying a first to-be-compared period among first periods that include one period of a pre-implementation period and a post-implementation period, the pre-implementation period being before implementation of an energy saving control with an air conditioner, the post-implementation period being after the implementation of the energy saving control with the air conditioner;
specifying, when each of second periods that include another period of the pre-implementation period and the post-implementation period is a to-be-compared candidate period, as a second to-be-compared period, based on a parameter history indicating an environment or an operation status of the air conditioner, a to-be-compared candidate period having a highest similarity level between 1) parameters in a first parameter comparison period including the first to-be-compared period and a first period, among the first periods, immediately before or after the first to-be-compared period, and
2) parameters in a second parameter comparison period including the to-be-compared candidate period and a second period, among the second periods, immediately before or after the to-be-compared candidate period;

setting the weighting coefficient for each parameter, by
specifying two first periods, among the first periods, having a minimum difference in power consumption amounts, or two second periods, among the second periods, having a minimum difference in power consumption amounts, and
setting, for each parameter, the weighting coefficient for each parameter in such a way that, when the value obtained by multiplying (i) the difference between the parameters of one period of the two first periods and the parameters of another period of the two first periods, or (ii) the difference between the parameters of one period of the two second periods and the parameters of another period of the two second periods, by the weighting coefficient is obtained, a total value of the values obtained for each parameter is minimum; and diagnosing, based on a power consumption amount in the first to-be-compared period and a power consumption amount in the second to-be-compared period, a level of energy saving derived from the implementation of the energy saving control, wherein the parameter history is a history of parameters; and
the second to-be-compared period specifier is configured to:
obtain, for each of the parameters, a value obtained by multiplying a difference between the parameters in the first parameter comparison period and the parameters in the second parameter comparison period by a weighting coefficient for each parameter; and
specify as the second to-be-compared period a to-be-compared candidate period having a smallest total value of the values obtained for each parameter.

3. A non-transitory computer-readable recording medium storing program for causing a computer to function as:
a first to-be-compared period specifier configured to specify a first to-be-compared period among first periods that include one period of a pre-implementation period and a post-implementation period, the pre-implementation period being before implementation of an energy saving control with an air conditioner, the post-implementation period being after the implementation of the energy saving control with the air conditioner;
a second to-be-compared period specifier configured to specify, when each of second periods that include another period of the pre-implementation period and the post-implementation period is a to-be-compared candidate period, as a second to-be-compared period, based on a parameter history indicating an environment or an operation status of the air conditioner, a to-be-compared candidate period having a highest similarity level between
1) parameters in a first parameter comparison period including the first to-be-compared period and a first period, among the first periods, immediately before or after the first to-be-compared period, and
2) parameters in a second parameter comparison period including the to-be-compared candidate period and a second period, among the second periods, immediately before or after the to-be-compared candidate period;

a coefficient setter configured to set the weighting coefficient for each parameter, the coefficient setter is configured to:
specify two first periods, among the first periods, having a minimum difference in power consumption amounts, or two second periods, among the second periods, having a minimum difference in power consumption amounts; and
set, for each parameter, the weighting coefficient for each parameter in such a way that, when the value obtained by multiplying (i) the difference between the parameters of one period of the two first periods and the parameters of another period of the two first periods, or (ii) the difference between the parameters of one period of the two second periods and the parameters of another period of the two second periods, by the weighting coefficient is obtained, a total value of the values obtained for each parameter is minimum; and an energy saving diagnoser configured to diagnose, based on a power consumption amount in the first to-be-compared period and a power consumption amount in the second to-be-compared period, a level of energy saving derived from the implementation of the energy saving control, wherein the parameter history is a history of parameters; and
the second to-be-compared period specifier is configured to:
obtain, for each of the parameters, a value obtained by multiplying a difference between the parameters in the first parameter comparison period and the parameters in the second parameter comparison period by a weighting coefficient for each parameter; and
specify as the second to-be-compared period a to-be-compared candidate period having a smallest total value of the values obtained for each parameter.

* * * * *